United States Patent

Mikkelsen et al.

[15] 3,654,445
[45] Apr. 4, 1972

[54] METHOD AND APPARATUS FOR DETERMINING AT LEAST ONE UNKNOWN DATA OF A BIOLOGICAL FLUID

[72] Inventors: Stig Glerup Mikkelsen, Herlev; Peter Ring, Klampenborg; Soren Peter Weis Stranddorf, Hareskov, all of Denmark

[73] Assignee: Radiometer A/S, Copenhagen, Denmark

[22] Filed: Jan. 8, 1970

[21] Appl. No.: 1,332

[30] Foreign Application Priority Data

Jan. 9, 1969 Great Britain..........................1,444/69

[52] U.S. Cl............................................235/151.3, 235/185
[51] Int. Cl. ..........................................................G06g 7/32
[58] Field of Search ....................235/151.3, 185, 92, 151.35; 23/253; 128/2; 374/71

Primary Examiner—Malcolm A. Morrison
Assistant Examiner—Edward J. Wise
Attorney—Craig, Antonelli and Hill

[57] ABSTRACT

The invention relates to a method and apparatus for determining at least one unknown parameter of a biological fluid, for example a blood sample.

The apparatus comprises equipment for reading known or measured data of the biological fluid into an analog computer—either by using digital or analog values of the known data—and with the analog computer being programmed to process the read-in data to produce therefrom a plurality of variable voltages which represent curves of different configuration in a hypothetical coordinate system and memorizing the magnitude of these voltages when they assume a value equal to a corresponding point of intersection between the curves of the hypothetical coordinate system, and including means for reading out the memorized values in analog or digital form.

Specifically, with respect to the biological fluid being a blood sample, the data to be read in are in the form of two correlated values of pH and $PCO_2$ and the method comprises the steps of producing two voltages which vary as a function of time and processing these voltages to assume in time sequence values corresponding to voltage values being analog with the two correlated sets of data and at the same time building up variable voltages which represent curves of a predetermined configuration in the hypothetical coordinate system, points of which are expression of the desired, unknown data, and after comparison memorizing the different voltages when they become equal and reading out the memorized values in analog or digital form.

33 Claims, 17 Drawing Figures

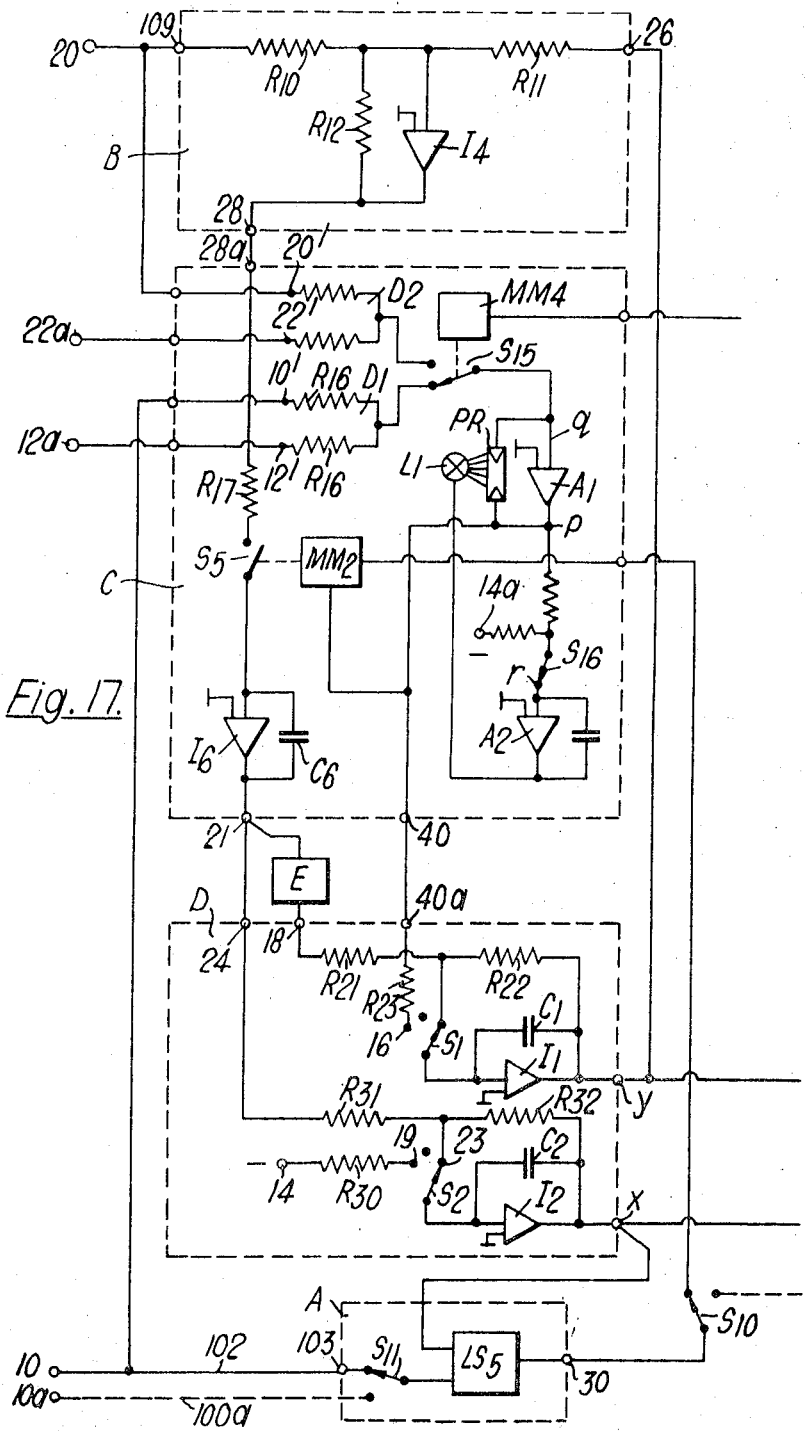

METHOD AND APPARATUS FOR DETERMINING AT LEAST ONE UNKNOWN DATA OF A BIOLOGICAL FLUID

The present invention relates to a method and apparatus for determining at least one unknown data of a biological fluid from two sets of correlated values of data of said fluid.

The invention is more especially concerned with biological fluids in which there is a substantially linear relationship between the known correlated data, i.e. where the relationship between the correlated data always can be represented by a substantially straight line in a hypothetical coordinate system, and where the unknown data can be represented by values assigned to points of intersection between said substantially linear curve and other curves which may be linear or non-linear of said hypothetical coordinate system.

In practically all aqueous fluids the relationship between pH and $PCO_2$ can be represented by a substantially straight line in a hypothetical coordinate system.

With respect to biological fluids this counts for all of them and as examples can be mentioned the cerebral spinal fluid, blood plasma and the blood itself which is the most complex biological fluid.

The invention will, therefore, in the following be described by way of example with specific reference to determining unknown data of the blood, but it will be obvious from the following specification that the invention is also applicable with modifications to other biological fluids of less complex nature than the human blood, so as to understand that in the determination of unknown data of such other biological fluids it will still be the principles of the invention which are used, namely the substantially linear relationship between pH and $PCO_2$, but the data to be determined will depend on the biological fluid in each case. While blood contains hemoglobin, blood plasma has substantially equal data as blood, but without any contents of hemoglobin, and in cerebral spinal fluids there is at least one data which in blood is an important data to be determined, and which is not found in the spinal fluid, namely Buffer Base and Base Excess.

The normal procedure of determining unknown data from blood is to equilibriate two samples of the blood with carbon dioxide to obtain two different partial pressures of carbon dioxide, referred to in the following as $PCO_2$ and to measure for each of these two equilibriated samples values of pH and using these values and the values of $PCO_2$ for the samples as coordinates in a coordinate system known as a nomogram.

To this purpose various nomograms have been constructed. Singer and Hastings have constructed a line chart, see Medicine, No. 27, page 223, 1948, and Siggaard Andersen and Engel have constructed a nomogram in the form of a pH - $logPCO_2$ coordinate system, see The Scandinavian Journal of Clinical & Laboratory Investigations, No. 12, page 177, 1960.

The data which can be derived from such nomograms, of which the last mentioned which in the following will be referred to as the Siggaard Andersen nomogram, are substantially as follows:

For normal blood the $PCO_2$ is 40 mm. Hg corresponding to pH = 7.40. Deviations from the normal $PCO_2$ indicate respiratory acid-base disorders.

Further data which when they deviate from normal values are used as measure of disorders are as follows:

Buffer base — in the following called BB — which is the sum of mainly bicarbonate and proteinate anions and which depends on the hemoglobin concentration.

Base excess — in the following called BE — which is the difference between buffer base and normal buffer base. A value of BE for 100 percent saturation of the blood with oxygen — in the following called $BE_{100}$ — can be calculated. Actual BE — in the following called $BE_{act}$ — can then be calculated according to a formula. If $PCO_2$ is calculated for 100 percent oxygen saturation, a correction is also necessary in order to determine the actual $PCO_2$ — in the following called $PCO_{2act}$.

Standard bicarbonate — in the following called SBC — represents the plasma bicarbonate at $PCO_2 = 40$ mm. Hg.

Actual bicarbonate — in the following called ABC — can be calculated from a formula.

Total $CO_2$ can be calculated as the sum of ABC and a constant multiplied with $PCO_{2ACT}$ It is also desirable to know the hemoglobin concentration in grammes per 100 ml.

All these data when derived from a nomogram are for the medical profession of interest as indicating respiratory or metabolic or combined respiratory and metabolic disturbances.

The use of nomograms requires, however, qualified staff which is trained in calculating the initial values, entering these in the nomogram, drawing lines in the nomogram and reading out the different values which correspond to points of intersection between the lines drawn and the lines printed in the nomogram. Apart from being a qualified job this is time consuming and does not eliminate the risk of human errors.

In many cases where a patient is brought into a hospital in a critical condition such as a result of a poisoning, it is, however, important to start the correct treatment as quickly as possible. The traditional procedure involved in using a nomogram does not enable the unknown data to be made available immediately, and there is, therefore, an unavoidable delay before the doctor can have the data avilable and prescribe the correct treatment of the patient.

It has been suggested to speed-up the processing of the aforementioned blood data by using a digital computer into which the measured data are read-in and which is programmed to write out the unknown important data. The necessary computer software is, however, due to the complexity of the calculations rather exhaustive and therefore expensive and though this scheme is feasible in big hospitals where the laboratory has access to a digital computer there is a substantial number of smaller hospitals and clinics who will not have access to a digital computer or cannot afford to invest in the software.

In addition it will be necessary to use a relatively large digital computer for calculating the unknown blood data, because a small computer with a limited memory will not have sufficient capacity to store the necessary complex calculations in the register.

The present invention arises from an appreciation of certain features which enables a different process of calculation to be followed, which process can utilize a relatively cheap and inexpensive analog computing apparatus.

According to the invention there is provided a method for determining at least one unknown data of a biological fluid of which correlated values of data that can be determined vary according to a substantially linear function, comprising the steps of determining a first and a second correlated set of values of said data, producing a first and a second correlated set of voltages corresponding to the two sets of correlated data and being analog therewith, producing a first and a second voltage both of which vary as a function of time an at one moment assume the value of the first set of analog voltages and at another moment assume the value of the second set of analog voltages, producing a third analog voltage which is relevant to the unknown data, comparing the third analog voltage with the first of said varying voltages, and reading out a value or a function of the third varying voltage when said first varying voltage becomes equal with the third analog voltage.

For convenience of description, the invention will be described in the following with reference to the Siggaard Andersen nomogram.

It is believed that the Siggaard Andersen nomogram is the most suitable one for simulation by means of analog computer techniques, and also because it has become more and more internationally used since it was first made available to the medical profession in 1960.

It will be obvious, however, that the invention is not limited to simulating this specific nomogram by using analog computer technique, and that the principles of the invention can be applied to any other nomogram available.

A nomogram is a coordinate system illustrated on a piece of paper and having printed thereon a system of lines and/or curves. By entering into the coordinate system points corresponding to the measured data such as the correlated pH and $PCO_2$ values, a line can be drawn between these points, and the points of intersection between the preprinted lines and/or curves can be found. The values of these points of intersection can then be found and these values represent the desired data.

In a line chart, it is necessary to follow the point of intersection between the line plotted between the two points and one of the lines of the line chart from the latter line to the edge of the line chart to read out the desired data.

In the Siggaard Andersen nomogram curves are printed which are graduated so that an unknown data can be read out of the nomogram directly from the graduation and the point of intersection between the curve and the line plotted between two points.

With specific reference to blood, the invention provides an electrical analog equivalent with the plotting of the line between the two points of the nomogram which represents the correlated values of pH and $PCO_2$ and simultaneously builds up an electrical analog of a curve, the point of intersection between which and the plotted line represents an unknown data.

With the simulation of the Siggaard Andersen nomogram, the two first mentioned voltages which vary as a function of time, simulate the plotting of the line between the two points of the nomogram which represents the correlated values of pH and $PCO_2$ and the third voltage which is produced simultaneously represents the base excess curve of the Siggaard Andersen nomogram and the function of this voltage represents the graduation of the base excess curve.

The initial values of the two voltages which vary as a function of time may be completely arbitrary and their adjustment to assume values first equal to the voltages which represent the first set of correlated pH and $PCO_2$ values and thereafter the voltages which corresponds to the second correlated pH and $PCO_2$ values may be achieved by using the try-and-try again principle in which differences between the values of the varying voltages and the values of the voltages which represent the correlated values of pH and $PCO_2$ are used to correct the initial value of the two voltages which vary as a function of time as well as the ratio therebetween which in the coordinate system determines the slope of the line. By making such a comparison a plurality of times it will be possible to provide the electrical analogy technique briefly mentioned to simulate the plotting of the line between the two points of the nomogram with sufficient accuracy after a number of times.

It has been found, however, that different blood samples with different $pH/PCO_2$ lines in the nomogram, but with the same hemoglobin contents have the $pH/PCO_2$ lines intersecting at such small areas off the sheet on which the nomogram is normally printed, that each of these areas of intersection is small enough to be considered as a point, and that all these points follow a curve which in the following will be referred to as the hemoglobin curve.

In reducing the invention to practice there is produced a function of one of the two voltages which vary as a function of time, to simulate the hemoglobin curve and adjust the initial values of the two voltages which vary as a function of time to assume values corresponding to points of the hemoglobin curve.

This has the advantage that the initial values of the two voltages are not completely arbitrary and that the value of the hemoglobin content can be made available as described below.

In addition our discovery of the hemoglobin curve and the production of the representation thereof in electrical analog form has the advantage that the actual analog value of the hemoglobin content is made available as an output which also facilitates the analog computation of other data which can be calculated according to formulae which are expressed by the contents of hemoglobin or a function thereof as it will be explained in the following. Furthermore, the hemoglobin corresponds to one correlated set of values of pH and $PCO_2$, and it will be possible only to use only one equilibriated blood sample with correlated values of pH and $PCO_2$ and as the second data to use a measured hemoglobin concentration.

According to a second aspect of the invention there is provided apparatus for determining at least one unknown data of a biological fluid of which correlated values of data which can be determined vary according to a substantially linear function, comprising in combination means for producing a first and a second correlated set of voltages corresponding to the two sets of correlated data and being analog therewith, means for producing a first and a second voltage both of which vary as a function of time and at one moment assume the value of said first set of analog voltages and at another moment assume the value of said second set of analog voltages, means for generating a third analog voltage which is relevant to the unknown data, comparison means for comparing said third analog voltage with the first of said varying voltages, and read-out means for reading out a value or a function of said third analog voltage when said first varying voltage becomes equal with said third analog voltage.

Preferably the apparatus includes a data selector comprising a plurality of push buttons and a display for showing the digital value of each data, the apparatus being constructed in such a manner that when the push button corresponding to one specific input data is actuated, a manually operable member is available for adjusting the display to show the digital value of the data in question, and when this value has been adjusted, the data will be read in by means of a command actuator in the practical embodiment a push button indicated as "STORE."

The apparatus may be also designed for reading in remote from a keyboard according to a predetermined code in digital form or from a teleprinter in digital form in predetermined normal language, or in analog form from measuring instruments.

The basic part of the apparatus is the analog computer to be described in more detail in the following. The analog computer comprises a plurality of peripheral equipment, the basic part of which is a register with a decoder and a control unit including a clock generator.

In the case of an input from panel of the apparatus the data are read directly into the register.

In the case of data being read-in from a remote control keyboard or a teleprinter the data are read into the register through a decoder which converts the language from the keyboard or teleprinter into the same language as used in the panel of the apparatus.

In the case where the data are supplied from an analog output source the data is fed to an analog-logarithmic converter which converts certain analog data which is represented in the form of logarithmic expressions into anti-logarithmic expressions, and from this converter the input is fed through an analog-to-digital converter into the register.

The register may be controlled by means of a control unit included in the analog computer or a separate control unit which gives the command to the register to read out the data, when required, following the analog computing. The control unit also instructs the register to supply the input to the analog computer when required.

The input connections between the register and the analog computer basically comprise a digital-to-analog converter for processing the data to be supplied to a number of analog memories controlled by the addresses and from which the data, converted into analog forms, are supplied to the analog computer.

The invention will now be described, by way of example, with reference to the accompanying drawings, in which:

FIG. 10 is a graphical illustration of an additional use of the apparatus;

FIG. 17 is a further modification of the arrangement of FIG. 9.

Figure 5:
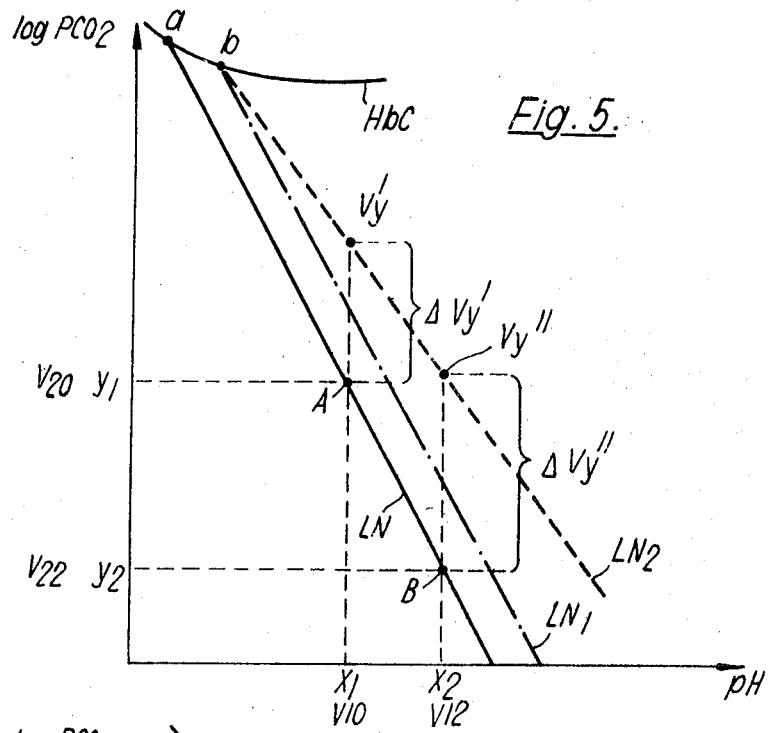
FIG. 5 is a graphical illustration useful to explain a part of the mode of operation of the apparatus.
Figure 6:
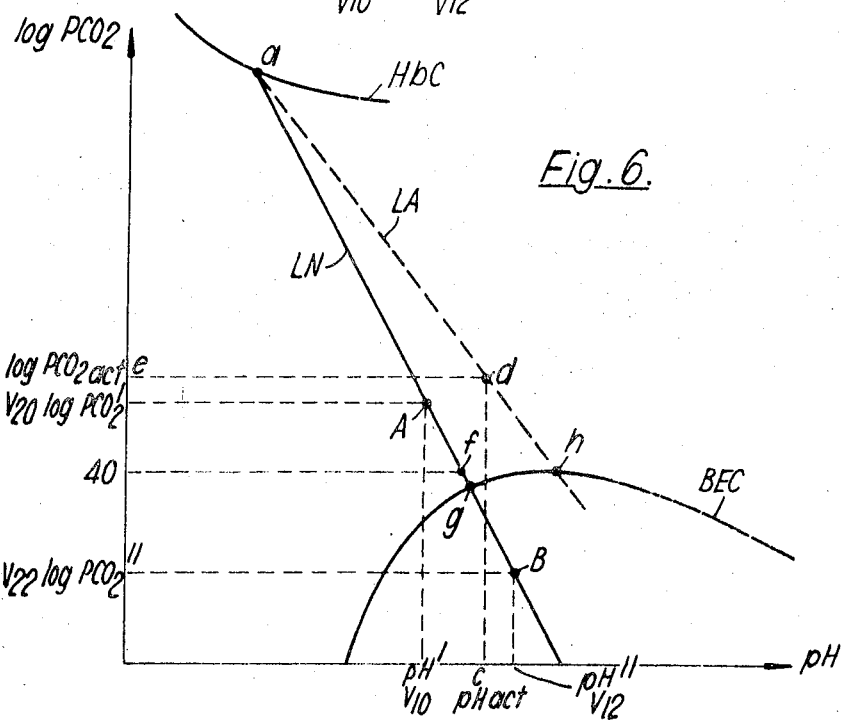
FIG. 6 is a graphical illustration useful to explain use of the apparatus.

The embodiments of the apparatus to be described in the following are especially for using a similar procedure as adopted in the use of the Siggaard Andersen/Engel pH/logP-$CO_2$ coordinate system with a few modifications thereof; the different voltages which are read into the apparatus as well as the voltages generated inside the apparatus simulates points and lines or curves in a hypothetical coordinate system and in order to make the invention more easily understood the use of the apparatus as well as a part of its mode of operation will therefore be explained with reference to the graphs of FIGS. 5 and 6 of which FIG. 6 is a substantial part of a Siggaard Andersen/Engel coordinate system — in the following called the SA nomogram.

It will be appreciated, however, that the invention is not limited with respect to the method to use the procedure of the SA nomogram or with respect to the construction of the apparatus to simulate the SA nomogram.

In the following the different blood data mm.Hg parameters mentioned in the preamble will be referred to by the abbreviations defined; $PCO_{2act}$ is expressed in mm.Hg. and ABC, SBC, $BE_{100}$ as well as $BE_{act}$ are expressed in meg./1.

In the following it will be assumed that two different correlated sets of values of pH and $PCO_2$ are determined as pH1, $PCO_2$1 and pH2, $PCO_2$2. This is standard procedure. The $PCO_2$ values are calculated from the $CO_2$ percentages of the two equilibriating gas mixtures. Instead of two equilibriations one only can be used if the hemoglobin concentration has been measured, because the hemoglobin corresponds to a point of the nomogram.

In many cases, when processing blood samples, it will also be necessary to know the actual pH — in the following referred to as $pH_a$ — whereby it is possible to find the actual $PCO_2$ — in the following referred to as $PCO_{2a}$. The actual pH can be measured from the blood sample in question. As it will be apparent from the following, however, it will also be possible to measure the actual $PCO_2$ and thereby to read out the actual pH.

With these possibilities in mind we have constructed the apparatus according to the invention with facilities for reading in all the different data here mentioned, and with the possibilities to select the data according to various methods which will be described in more detail in the following according to method selecting facilities also provided in the apparatus.

Figure 1:
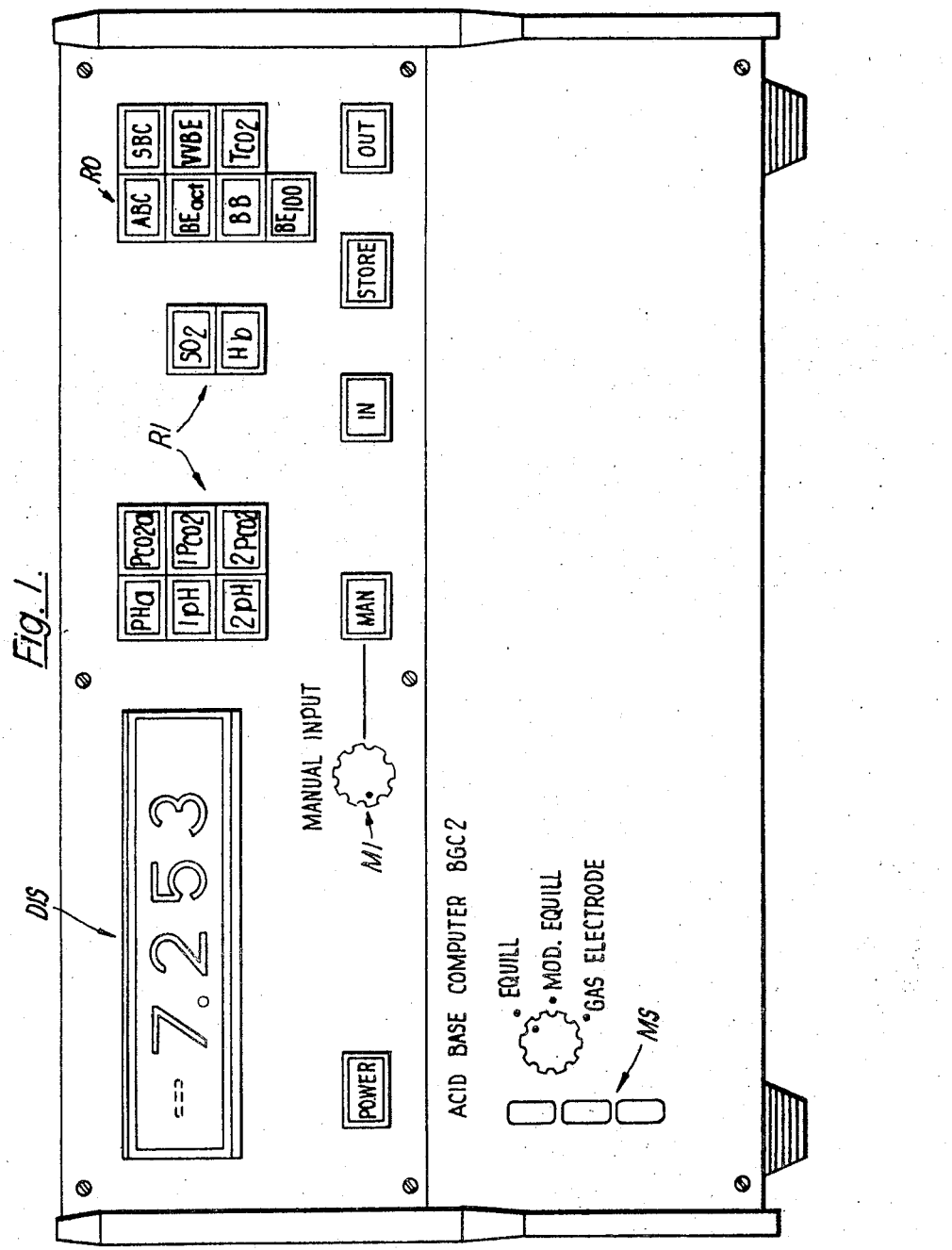
FIG. 1 is an illustration of the front panel layout of an apparatus according to the invention.

In the actual construction of the apparatus with the front panel as shown in FIG 1, one group of reading in selector means in the form of a group of push buttons RI is provided and a second group of reading out means in the form of a group of push buttons RO is provided.

A further group of method selector means in the form of the push buttons MS is provided.

All the push buttons shown can be referred to as a parameter selector panel.

By using this panel a manual input MI is provided which is rendered effective by actuating a push button referred to as MAN.

The front panel is provided with a display DIS in which the digital value of each data can be displayed during the input as well as during the output procedure.

The panel is further provided with an input control push button IN, an output control push button OUT and a store control push button STORE.

By using data selector panel on the front side of the apparatus for reading in the values data the procedure is as follows:

The push button IN is activated followed by activation of an input parameter push button e.g. pH1.

Then the manual selector MAN is activated. Thereafter the manual input MI is manipulated to obtain the value of pH1. When the desired value of pH1 is shown at the display the STORE push button is activated and the pH1 value is automatically read into the apparatus.

In a similar manner the other data necessary according to the method selected can be read in.

Prior to the reading in obviously the method to be used must be selected. This is done by activating the appropriate one of the push buttons on the method selector panel MS.

When the necessary number of data have been read in the next step is reading out the data.

The procedure followed in the reading out is as follows:

The various data which can be read out are marked on the push buttons of the reading out panel RO and comprises the $BE_{100}$ actual base excess ABE, the buffer base BB, the actual bicarbonate ABC, the standard bicarbonate SBC. In addition thereto the apparatus has facilities for reading out a data which is called "base excess in vivo" which is the actual base excess in the living organism as it will be explained more fully in the following. Eventually facilities are provided for reading out the total $CO_2$ concentration referred to as $T_{CO_2}$.

When reading out the OUT push button is activated and in response to activation of the individual ones of the push buttons of the reading out panel the corresponding data will be displayed on the display.

Figure 2:
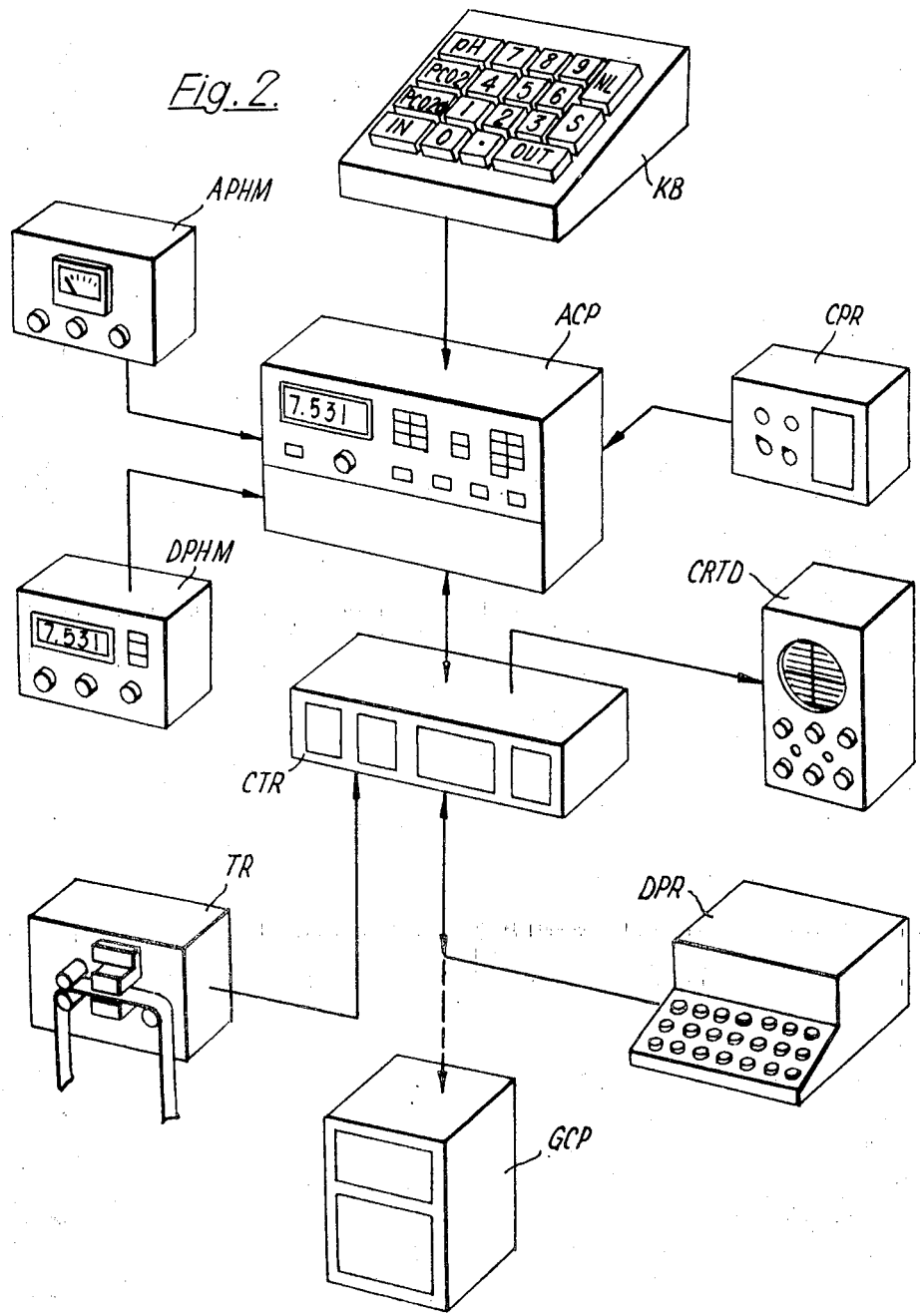
FIG. 2 is a schematic flow diagram illustrating various possibilities for reading in and reading out data.

The apparatus may be used according to the method here briefly described, but in order to render the apparatus more versatile and applicable in connection with other equipment available we have designed the apparatus for remote control with respect to reading in facilities as well as reading out facilities as schematically illustrated in FIG. 2.

As explained hereinbefore the central part of the equipment according to the invention is an analog computer which is specifically designed and preprogrammed to solve the problems.

This analog computer is illustrated in FIG. 2 and referred to as ACP.

The analog computer is provided with selector means (not shown) such as push buttons or selector switches for adjusting the analog computer to the various reading in and reading out facilities.

In the embodiment of FIG. 2 five different reading in possibilities are foreseen.

KB designates a keyboard with keys for reading in and reading out marked IN and OUT, respectively, a key for store marked S, keys for pH and $PCO_2$ as well as $PCO_{2act}$ and a disc calculator type keyboard with the numbers 0 – 9 and decimal point. In addition, the keyboard has a key for period and a key marked NL, the function of which will be described later.

When using this keyboard for reading in the various data a predetermined code is used, which is made available to the user of the equipment in the form of instructions for use. By way of example reading in the $pH_{actual}$ corresponding to activating the push button $pH_a$ of FIG. 1 can be coded as "pH" "0." By reading in for example $pH_{actual}$ being 7.38 it is necessary to press the following keys of the keyboard KB "IN" then "pH" thereafter in sequence "0," "7," ".," "3" and "8" and finally "S."

In the actual construction of the apparatus the various push buttons are transparent and illuminated with a flashing light indicating that the push buttons which represent the data which is ready for reading in or is read out and with the flashing being extinguished when the reading in or reading out has taken place.

In the example here mentioned, the reading in of the pH value will automatically cause the $pH_a$ push button of the panel of FIG. 1 to flash and the value of pH 7.38 will be shown on the display until the "S" button is activated.

Instead of using the keyboard KB for reading in, a printer in the form of a typewriter as normally used in connection with digital computers may be used and is referred to as DPR. Since the analog computer ACP is designed to understand a specifically coded language as exemplified hereabove with respect to $pH_{actual}$ a code translater CTR is connected between the printer DPR and the analog computer.

As an alternative to a digital printer a tape reading TR may be used for feeding in information already available on tape.

Instead of digital input in the manner here described, the data may be made available in analog or digital form directly from measuring instruments such as for example shown in analog form from an analog pH-meter APHM or in digital form from a digital pH-meter DPM.

With the brief description given here before it will be understood how the auxiliary equipment shown in FIG. 2 is used for reading in the data.

The reading out may be provided directly on the selector panel of the analog computer and, according to adjustment of appropriate output selectors routed to different exterior recorders such as directly to the code printer CPR, or through the code translater CTR to the digital printer DPR or, if desired, to a cathode-ray tube display CRTD.

The reading-out may also be controlled from the keyboard using the identification keys with the corresponding code keys to command the reading out. For example, reading out the stored value of $pH_{actual}$ being 7.38 requires as before the actuation of the keys "OUT," "pH" and "0," whereafter the stored value together with the identification code either coded or in plain language will be directed through the correct channel to the selected one of the reading out instruments.

As it will be understood it is, when using a printer also possible to make available relevant records about the patient to whom the blood sample in question belongs, and it will be possible to combine the entire group of equipment as shown in FIG. 2 with a general purpose computer GCP, into which all the information which is made available by the reading in as well as by the reading out is stored and if desired, processed for statistical or other purposes.

Figure 3:
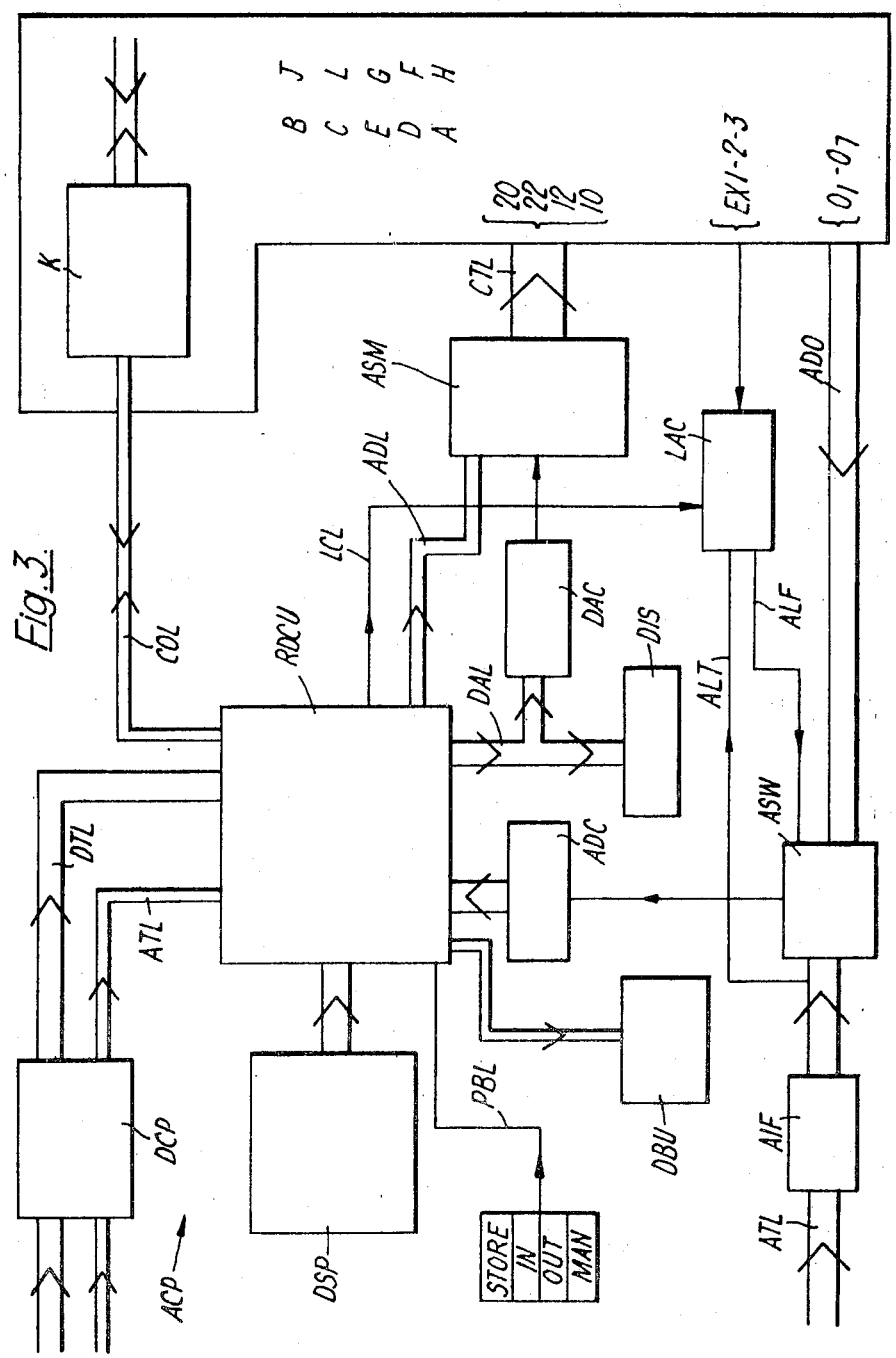
FIG. 3 is a schematic illustration showing in the form of block diagram an apparatus according to the invention with ancillary units.

While in FIG. 2 only the general equipment is shown in interrelated operative relationship, the ancillary units of the analog computer is shown in somewhat more detail in FIG. 3.

The basic part of the peripheral equipment is a register with decoder, control units and clock generator referred to as RDCU to which all the information is supplied and to which also the output is supplied in the case of digital output.

The data selector panel DSP of FIG. 1 is directly connected with the register RDCU.

The information from the keyboard KB or any of the other digital input devices is fed into a decoder/comparator DCP, from which the data and addresses are fed into the register RDCU through a data line DTL and an address line ATL, respectively.

The analog signals, such as for example from an analog pH-meter APHM (FIG. 2) are fed into the register RDCU through an analog interface AIF, an analog switch ASW and an analog-to-digital converter ADC.

Certain analog data, such as the $PCO_2$ data is supplied in logarithmic form and is through a line ALT routed to a logarithmic/antilogarithmic converter LAC, in which they are converted into anti-logarithmic expressions and through a line ALF fed back into the analog switch ASW.

The analog switch ASW is also connected directly with an analog data output line ADO from the analog computer. The function of the analog switch ASW is to select between the inputs from the analog inputs and the analog outputs from the analog computer.

The four push buttons of the data selector panel referred to as MAN, IN, STORE and OUT are through a line PBL connected with the register RDCU to control the function thereof in accordance with the manipulation of these push buttons. Obviously, when the push button MAN is operated the register is conditioned only for receiving signals from the data selector panel DSP and the actuation of the push buttons STORE, IN and OUT renders the register RDCU effective to store the incoming data and control the reading out of the data from the analog computer respectively.

As it will be apparent from the following description, it is not only certain of the analog data, which are supplied in logarithmic form, such as the $PCO_2$, but also other data are supplied in logarithmic form or requires processing in logarithmic form. To this purpose the register RDCU is through a log converting line LCL connected with the log/analog converter LAC and through the feed back ALF to the register and the control unit. All the information supplied to and stored in the register RDCU is supplied to an analog switch and memory ASM, which is controlled via the addresses supplied directly through a line ADL. The data is supplied through a line DAL, and a digital analog converter DAC.

The input line to the analog computer is referred to as CTL and extends to various input terminals of the analog computer as it will be described in the following.

The analog computer has a plurality of outputs as will be described in the following. These outputs extend into the output transmission line previously mentioned referred to by ADO and the output data are through the analog switch ASW and the analog-to-digital converter ADC fed back to the register and control unit RDCU for processing to be rendered available in digital form in a digital output device generally referred to by DBU which represents any of the digital output devices of FIG. 2.

The input line from the analog switch and memory ASM to the analog computer ACP represents the data which can be fed into the analog computer by means of the data selector panel input push buttons of FIG. 1.

The output to the data output line ADO of FIG. 3 represents all the outputs from the analog computer represented by the output push buttons of the group RO (FIG. 1).

In addition, a control unit is included in the analog computer or may within the scope of the invention also be a separate part or included in the ancillary units and is through a control line COL connected with the register RDCU in such a manner that the register is operated in predetermined timed relationship with the control unit of the analog computer.

The layout of the ancillary units of FIG. 3 and the short description of its mode of operation is only described here in order to indicate the technique applied in these units.

It is believed that with the following description of the operation of the analog computer and its control units it will only be a matter of routine to those skilled in the art of computer techniques to design adequate ancillary units with the information given herein before.

As apparent from the foregoing description a selected plurality of data are fed into the analog computer depending on a preselected scheme in accordance with which the analog computer is going to be used.

The basic data to be fed into the analog computer are as previously explained data corresponding to two different correlated sets of values of pH and $PCO_2$.

Figure 4:
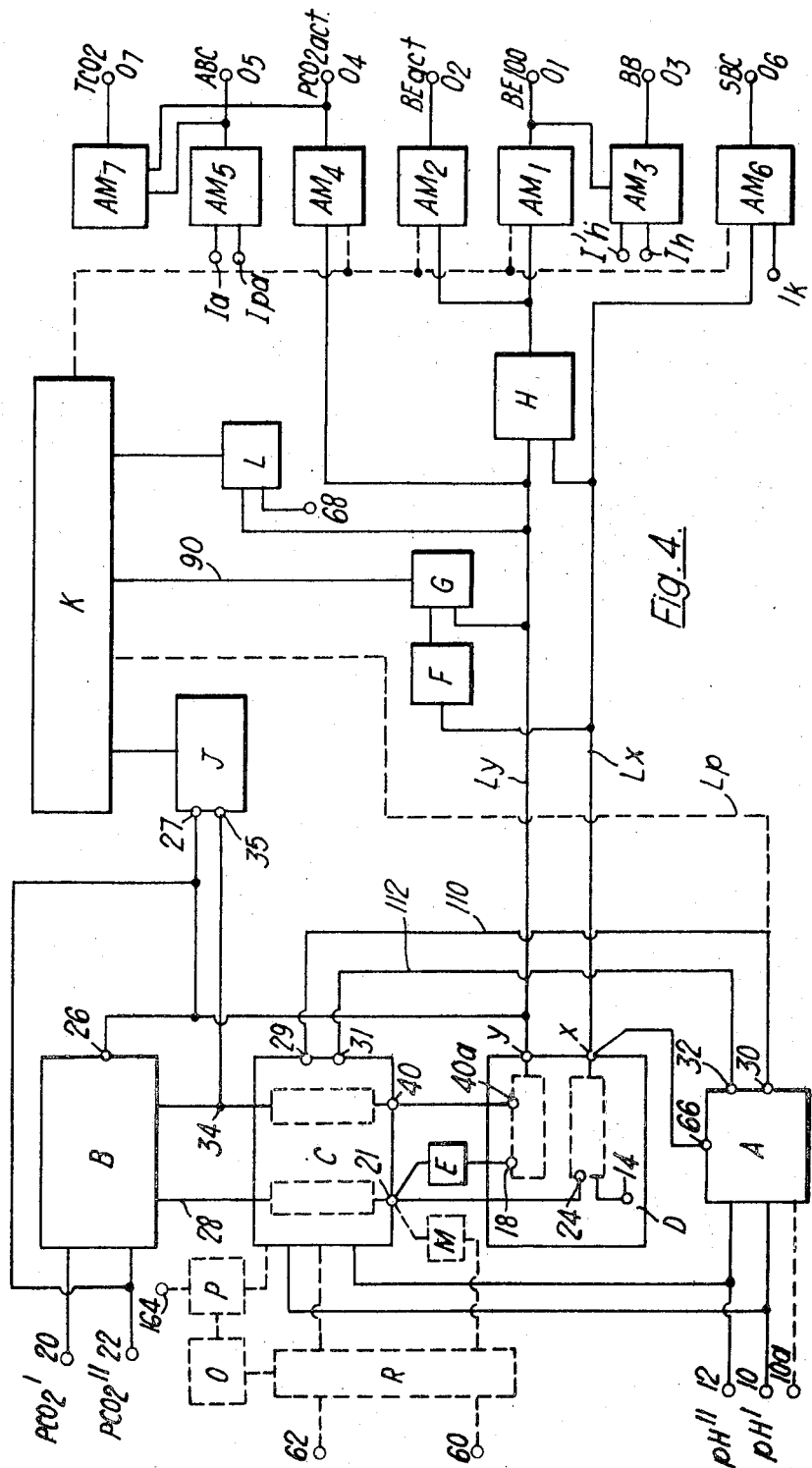
FIG. 4 is a block diagram of an apparatus according to the invention.

These data are supplied to input terminals 10,20 and 12,22, respectively of the apparatus of FIG. 4.

For the sake of simplicity these voltages will in the following be referred to as $V_{10}$, $V_{12}$, $V_{20}$ and $V_{22}$.

The voltages $V_{10}$, $V_{20}$ represent a point A of a hypothetical coordinate system, and the voltages $V_{12}$, $V_{22}$ represent a point B of a hypothetical coordinate system, as illustrated in FIG. 5.

The apparatus of FIG. 4 provides means for processing these two pairs of voltages $V_{10}$, $V_{20}$ and $V_{12}$, $V_{22}$ to produce an electrical analogy of the Siggaard Andersen nomogram, which includes drawing a substantially straight line between the two points A and B, as well as an electrical analogy of the base excess curve of the Siggaard Andersen nomogram and reading out the base excess and other unknown data as desired.

To this purpose the apparatus comprises in brief terms a network D, which generates two voltages which vary as a function of time.

By using a comparison technique the initial values of these two voltages as well as the ratio therebetween is adjusted in such a manner that at one moment the two variable voltages assume the values of the voltages $V_{10}$ and $V_{20}$ and at another moment the two voltages assume the value of the voltages $V_{12}$, $V_{22}$.

Simultaneously, a third voltage which also varies as a function of time, is produced. This voltage is relevant to an unknown data, i.e. the base excess and is produced as a function of one of said variable voltages designed to simulate the base excess curve of the Siggaard Andersen nomogram.

By using a comparison technique the value of said third voltage or a function thereof which represents a graduation along the curve it represents, is recorded or memorized when said third voltage becomes equal to one of the two variable voltages and the recorded or memorized value is read out.

In more specific terms, the blocks of the diagram of FIG. 4 marked A, B, C and D include networks for generating and processing the variable voltages to assume the correct values so that in timed sequence they coincide with the voltages corresponding to the points A and B of FIGS. 5 and 6.

These voltages are through output terminals $x$ and $y$ of the network D supplied to lines $L_x$ and $L_y$.

The voltages on the line $L_x$ are supplied to a function generator F which processes the voltages so as to produce a voltage which substantially follows the base excess curve BEC of FIG. 6.

The output from the function generator F is fed into a limit sensor G which is connected with the line $L_y$ so that when the voltage on the line $L_y$ becomes equal to the output voltage from the function generator F a signal is through a line 90 supplied to a control network K, which through a connection shown in FIG. 4 in dotted lines is connected with the plurality of networks shown as blocks.

Each of these blocks represents an analog memory and when the voltages of the line $L_y$ and the output voltage from the function generator F becomes equal to the control network K actuates the memory element $AM_1$ and records the magnitude of the voltage which represents the base excess.

Figure 8:
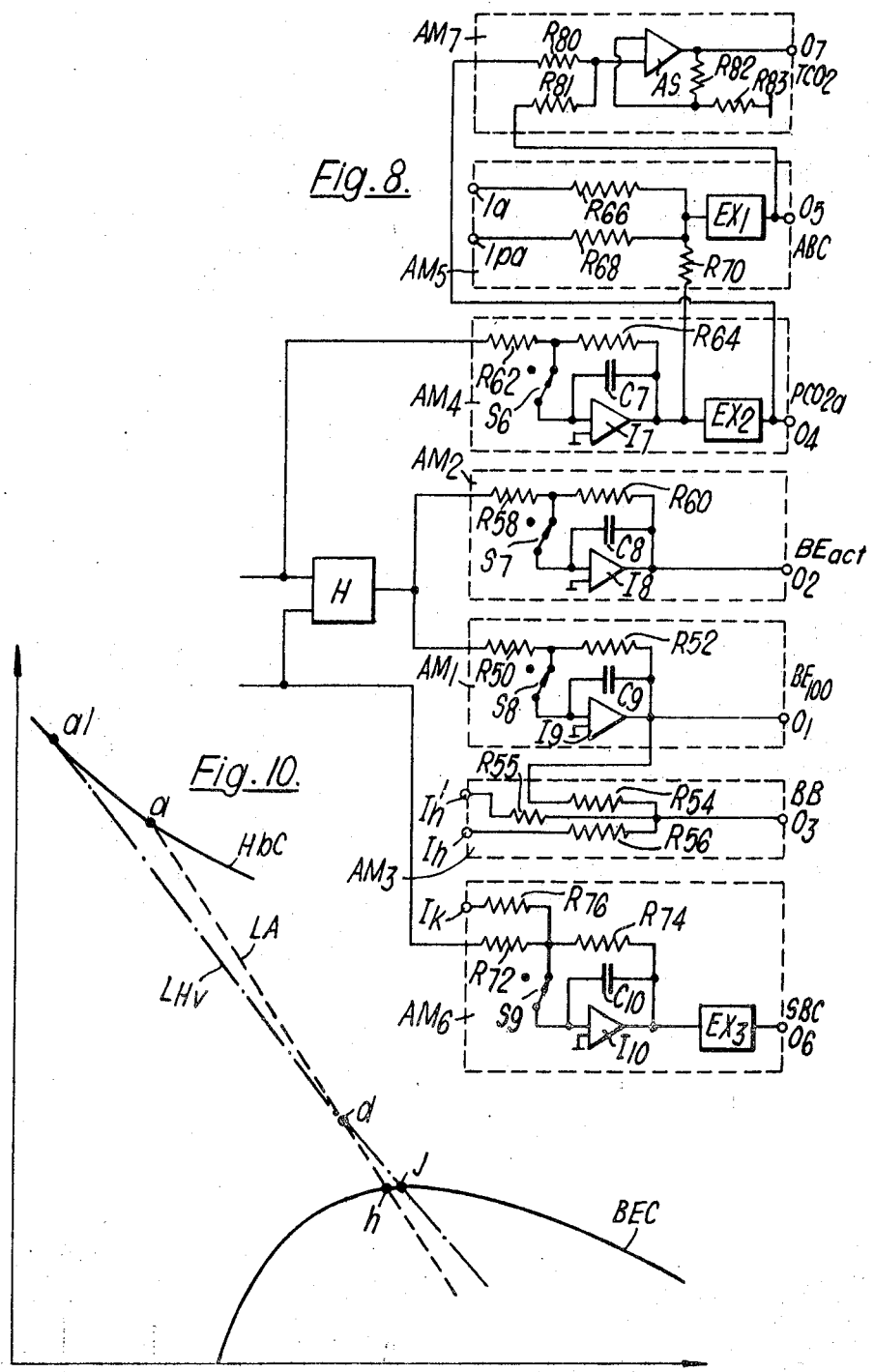
FIG. 8 is a more detailed diagram of another part of the apparatus of FIG. 4.

The analog memories of FIG. 4 are shown in some more detail in FIG. 8.

The network $AM_1$ for memorizing and reading out the $BE_{100}$ comprises an integrator amplifier $I_9$ with a capacitor $C_9$ and two resistors in series $R_{50}$ and $R_{52}$ between the connecting point of which a switch $S_8$ is provided the opening and closing of which is controlled from the control network K.

The network $AM_3$ is an addition network which includes a resistor $R_{54}$ which is connected to the output from the integrator amplifier $I_9$, a resistor $R_{56}$ which is connected with an input terminal $I_h$ and a resistor $R_{55}$ which is connected to a terminal $I'_h$ to which a reference voltage 13 is applied.

The network $AM_2$ is similar to the network $AM_1$ and includes an integrator amplifier $I_8$, a capacitor $C_8$ with two resistors $R_{58}$ and $R_{60}$ as well as a switch $S_7$.

Also the network $AM_4$ is an integrator network having an integrator amplifier $I_7$, a capacitor $C_7$, two resistors $R_{62}$ and $R_{64}$ and a switch $S_6$.

The output from the integrator amplifier $I_7$ of the network $AM_4$ is connected through a resistor $R_{70}$ to two resistors $R_{66}$ and $R_{68}$ in the network $AM_5$. The other end of these two resistors is connected with input terminals $I_a$, $I_{pa}$ to which constants are applied as will appear from the following.

The network $AM_6$ also is an integrator network having an integrator amplifier $I_{10}$, a capacitor $C_{10}$ with two resistors $R_{72}$ and $R_{74}$ and a switch $S_9$. The junction point between these two resistors is connected through a resistor $R_{76}$ to an input terminal $I_k$.

The network $AM_7$ is provided for obtaining the total $CO_2$ concentration, $T_{CO2}$. The network comprises an amplifier $A_s$ to one input of which are connected the outputs on the terminals $O_4$ and $O_5$ via respective resistors $R_{80}$ and $R_{81}$. A second input of the amplifier $A_s$ is connected on the one hand to ground through a resistor $R_{83}$ and on the other hand to the amplifier output and terminal $O_7$ through resistor $R_{82}$. The total $CO_2$ concentration is calculated from the formula:

$TCO_2 = ABC + 0.0306 \times PCO_2$

ABC appears on terminal $O_5$ and $PCO_2$ on terminal $O_4$.

The mode of operation of these networks and the formula used in calculating the output from the different networks will appear from the following.

Since in practice, it is not so much the actual value of the base excess curve in one coordinate which is interesting as the value of a graduation along the base excess curve of FIG. 6 which is interesting, a further function generator H is included in the apparatus and it is the output from this further function generator which is supplied to the memory $AM_1$. The function generator H generates a function of the two variable voltages on the lines $L_x$ and $L_y$ which represents the graduation of the base excess curve BEC of FIG. 6.

The fact that the base excess curve can be imitated in electrical analogy by means of a function generator which processes the voltages on the two lines $L_x$ and $L_y$ will be understood, because the base excess curve can be defined as the geometric locus for corresponding pH and $PCO_2$ values of blood samples fulfilling the equation:

$BE_{cells} = BE_{plasma}$

As apparent from the coordinate systems of FIGS. 5 and 6 the abscissa represents the pH and the ordinate represents the log $PCO_2$ which means that the voltage on the line $L_x$ is representative of the pH, and the voltage on the line $L_y$ is representative of the $logPCO_2$.

The actual value read out, by means of the processing of the voltage here described, corresponds to the point $g$ of the simulated nomogram of FIG. 6, which represents the value of $BE_{100}$.

The buffer base BB can be calculated by means of the formula:

$BB = BE_{100} + 41.7 + 0.424 \times Hb$ where Hb is the hemoglobin in grammes per 100 ml.

In order to calculate the BB directly from $BE_{100}$ the apparatus according to the invention is provided with a further network R shown in dotted lines in FIG. 4 for enabling the reading in as well as the reading out the hemoglobin in a manner to be more fully described in the following. The reading out terminal for the hemoglobin is referred to by 60 and is connected with an input terminal $I_h$ of the network $AM_3$ which has another input which is connected with the output $BE_{100}$ from the memory network $AM_1$. The network $AM_3$ is a simple addition network and has an output $O_3$ from which the BB can be read out.

Though the $BE_{100}$ is a desirable factor to calculate it is not relevant to the actual blood sample because the $BE_{100}$ corresponds to 100 percent oxygen saturation of the blood after equilibration. The actual blood sample which is taken somewhere in the organism has less oxygen saturation and, therefore the actual base excess $BE_{act}$ is located at a point of the curve BEC remote from the point $g$ of FIG. 6 and can be caculated by means of the formula:

$BE_{act} = BE_{100} + 0.3 \times Hb \times (100 - SO_2/100)$ where Hb is the hemoglobin and $SO_2$ the actual oxygen saturation of the blood sample which can be measured.

$BE_{act}$ can also be found as the point of intersection between the curve BEC of FIG. 6 and a line the slope of which is different from the line LN of FIG. 6.

As mentioned hereinbefore, the apparatus includes means for swinging or changing the slope of the line. To this purpose the network R of FIG. 4 is connected with a network 0 to which the analog voltage of the hemoglobin is supplied and which is a function generator from which the output is supplied to a multiplication network P at an input terminal 64 of which the analog value of $100 - SO_2$ is supplied. The output from the multiplication network P is supplied to the network C which include means to be described in more detail with reference to FIG. 9 to change the slope of the line to correspond to the dotted line LA of FIG. 6 — or expressed in terms of the electrical operation of the apparatus — to change the voltage $V_y$ on the line $L_y$ in such a manner that the limit sensor G is triggered at a different state of coincidence between the output from the function generator F and $V_y$.

The line LA can be referred to as the "line for actual values" and the point $h$ of FIG. 6 represents the $BE_{act}$. With the apparatus readjusted in the manner here described the analog memory $AM_2$ which is identical with the memory $AM_1$ and also connected with the output of the function generator H is operated in a similar manner as described with reference to the memory $AM_1$ and $BE_{act}$ is read out from the output $0_2$. Obviously $PCO_{2act}$ is the ordinate of the line LA corresponding to $pH_{act}$ as abscissa and can be found with the apparatus adjusted to operate with the "actual line" LA by reading in $pH_{act}$ which is supposed to be a known measured data. To this purpose the network A which also is a comparison or limit sensing network has an extra input $10a$ to which an analog voltage corresponding to $pH_{act}$ can be applied as well as an input 66 for the voltage $V_x$ from the output terminal $x$ of the network D. In addition, the further analog memory $AM_4$ which is similar to the memories $AM_1$ and $AM_2$ has its input connected with line $L_y$. When $V_x$ and $V_y$ vary and $V_x$ becomes equal to $V_{pHact}$ the corresponding value of $V_y$ in the memory $AM_4$ is equal to $V_{PCO2act}$. At this moment the network A triggers a signal to the control network K through a line $L_P$ and the network K gives in its turn a signal to the memory $AM_4$ to maintain the $V_y$ voltage therein which is analog with log$PCO_{2act}$ and can be read out on the output $0_4$. The corresponding point is the point $d$ in FIG. 6.

The actual bicarbonate ABC can be calculated from the formula:

$pH_{act} = K + \log(ABC/\alpha \times PCO_{2act})$ in which $K$ is a constant and $\alpha$ is the solubility coefficient of $CO_2$ in blood plasma and can be derived from a tabulation.

This formula can be rewritten to express ABC as $\log ABC = pH_{act} - K + \log(\alpha PCO_{2act})$ and as it will be understood this enables ABC to be calculated in the calculation network $AM_5$ to which the analog value of log$PCO_2$ is applied from the network $AM_4$ and which has input terminals $I_a$ and $I_{pa}$ for application of analog voltages corresponding to the constant K and $pH_{act}$. ABC is read out from the terminal $0_5$.

As mentioned hereinbefore, the standard bicarbonate SBC is the plasma bicarbonate at $PCO_2 = 40$ mm. Hg; the SBC can be calculated from the formula $pH_{40} = K + \log(SBC/\alpha \times 40)$ where $pH_{40}$ is the pH when $PCO_2 = 40$ and $SO_2 = 100$ percent and where K and $\alpha$ are the same as in the formula for ABC. By rewriting this formula SBC is found as:

$\log SBC = pH_{40} - K + \log(\alpha \times 40)$ and as it will be understood this enables SBC to be calculated in a summation network in which $pH_{40}$ is found.

Obviously $pH_{40}$ is the abscissa on the line LIN corresponding to $PCO_2 = 40$ and can be found by memorizing $V_x$ in the moment a limit sensor signals that $V_y$ has become equal to $V_{PCO_2(40)}$. To this purpose a limit sensor L is provided between the line $L_y$ and the control network K and is provided with an input 68 to which the analog voltage corresponding to $PCO_2 = 40$ is supplied so as to be triggered when $V_y$ reaches this value. The line $L_x$ is connected with an input of the network $AM_6$ which is a combined analog memory and summation network with a further input $I_k$ to which a voltage corresponding to $K - \log(\alpha \times 40)$ is applied. When the limit sensor L is triggered the value of $V_x$ in the memory $AM_6$ is equal to $V_{pH40}$ and SBC can be read out on the terminal $0_6$.

As apparent from this explanation and the formulae used in connection with the explanation of the method, the output voltages which represent $PCO_{2act}$ and SBC are not analog with the actual values thereof, but analog with log$PCO_{2act}$ and logSBC respectively and in order to convert the logarithmic values exponential amplifiers $EX_2$ and $EX_3$ are provided in series with the integrator amplifiers $I_7$ and $I_{10}$. Since the summation network $AM_5$ also operates with a logarithmic value, an exponential amplifier $EX_1$ is also necessary in this network.

While in the foregoing only basic principles of the apparatus have been described in order to make the method understood the further details of the apparatus and its mode of operation will be described in the following with reference to FIG. 7. The part of the apparatus in which the two voltages $V_x$ and $V_y$ which vary as a function of time are generated is the network D which includes two integrators $I_1$ and $I_2$.

The input terminals 10 and 12 for the voltages $V_{10}$ and $V_{12}$ corresponding the pH values $pH_1$ and $pH_2$ are through lines 100 and 102 connected with input terminals 101 and 103 for the network A as well as through the lines 104 and 106 connected with input terminals 105 and 107 for the network C.

The network A includes two limit sensors LS2 and LS5 respectively, each of which has one input connected with the input 101 and 103 and another input both of which are connected with the output terminal $x$ from the network D.

In the line which connects the input terminal 12 with the input of the limit sensor LS2 a switch $S_{11}$ is provided to alternatively connect the input of the limit sensor LS2 with a line $100_a$ leading to the input terminal $10_a$ for input of an analog voltage which represents $pH_{act}$.

The output terminals 30 and 32 of the network A are through lines 110 and 112, respectively, connected with the input terminals 29 and 31, respectively, of the network C.

The input terminals 20 and 22 for the voltages $V_{20}$ and $V_{22}$ which represent the two $PCO_2$ values are connected with input terminals 109 and 111 of the network B.

Eventually, outside the networks a line 114 is connected between the output terminal $y$ of the network D and an input terminal 26 of the network B.

In the network B the terminal 109 is through a resistor $R_{10}$ connected with a switch $S_3$ in series with an operational amplifier $I_4$ which by being shunted with a capacitor $C_4$ operates as an analog memory. The input terminal 26 of the network B is through a resistor $R_{11}$ connected with the switch $S_3$ and across the switch $S_3$ in series with the operational amplifier, a further resistor $R_{12}$ is connected.

The series connection of the switch $S_3$ and the analog memory $I_4$, $C_4$ is through a resistor $R_{13}$ connected with an operational amplifier $A_f$ which is shunted by a resistor $R_{16}$. In addition connections to the operational amplifier $A_f$ are provided through resistors $R_{14}$ and $R_{15}$ from the input terminals 111 and 26 respectively. Eventually, the amplifier $I_4$ is through a line 116 connected with a terminal 28 and the output end of the amplifier $A_f$ is connected with a terminal 34.

These two terminals are connected with corresponding input terminals $28a$ and $34a$ of the network C. The terminal $28a$ is in the network C through a resistor $R_{17}$ connected in series with a switch $S_5$ and an operational amplifier $I_6$ shunted by a capacitor $C_6$ leading to an output terminal 21.

The input terminal $34a$ is through a resistor $R_{18}$ in series with a switch $S_4$ connected with an operational amplifier $I_3$ shunted by a capacitor $C_3$ and extends to an output terminal 40.

In the network C a monostable multivibrator $MM_1$ is provided having its trigger input connected with the terminal 31 and a series connection of two monostable multivibrators MM$_2$ and MM$_5$ is provided, MM$_5$ having its trigger input connected with the input 29.

The multivibrator MM$_1$ is operatively connected with the switch S$_4$ and the time during which the switch is kept closed is controlled by signal from the input terminals 105 and 107 through lines 120 and 122.

The multivibrator MM$_2$ is operatively connected with the switch S$_5$ and the time during which this switch is kept closed, is controlled by a signal from the output of the amplifier I$_3$ through a line 118.

The multivibrator MM$_5$ is operatively connected with the switch S$_3$ of the network B.

The terminal 21 is connected directly with a terminal 24 of the network D, and in addition the same terminal 21 is through a function generator E the role of which will be explained later connected with a terminal 18 of the network D.

The network D comprises two internal terminals referred to by 16 and 14. The terminal 16 is through a resistor R$_{20}$ connected with a point 16a which represents one terminal of a switch S$_1$ of which the other terminal 17 is connected through a resistor R$_{21}$ to the terminal 18 and through a resistor R$_{22}$ with the output end of an integrator comprising an operational amplifier I$_1$ shunted by a capacitor C$_1$. The input of the integrator is connected with the switch S$_1$. Also, the input terminal 40a is through a resistor R$_{23}$ connected with the point 16a.

In a somewhat similar manner the terminal 24 is through a resistor R$_{31}$ connected with one terminal 23 of a switch S$_2$ and through a resistor R$_{32}$ to the output and of an integrator I$_2$, C$_2$ the input of which is connected with the switch S$_2$. The other terminal 19 of the switch is through a resistor R$_{30}$ connected with the terminal 14.

The operation of the circuit here described is substantially as follows.

The initial conditions of the integrators I$_1$, C$_1$ and I$_2$, C$_2$ are given by the voltages at the points 18 and 24 which are supplied to the integrators through two switches S$_1$ and S$_2$ which are in the positions shown in full lines. When these switches are shifted to the left hand position the integrators are supplied with current through the resistors R$_{20}$ and R$_{30}$ which are connected with the points 14 and 16 having the voltages $-V_{(14)}$ and $V_{(16)}$ respectively. The voltages $-V_{(14)}$ and $V_{(16)}$ are equal to a reference voltage referred to as Va having good short time stability. At the same time the integrator I$_1$, C$_1$ is supplied with current through the resistor R$_{23}$ which is connected with the output terminal 40 from the network C.

Figure 7:
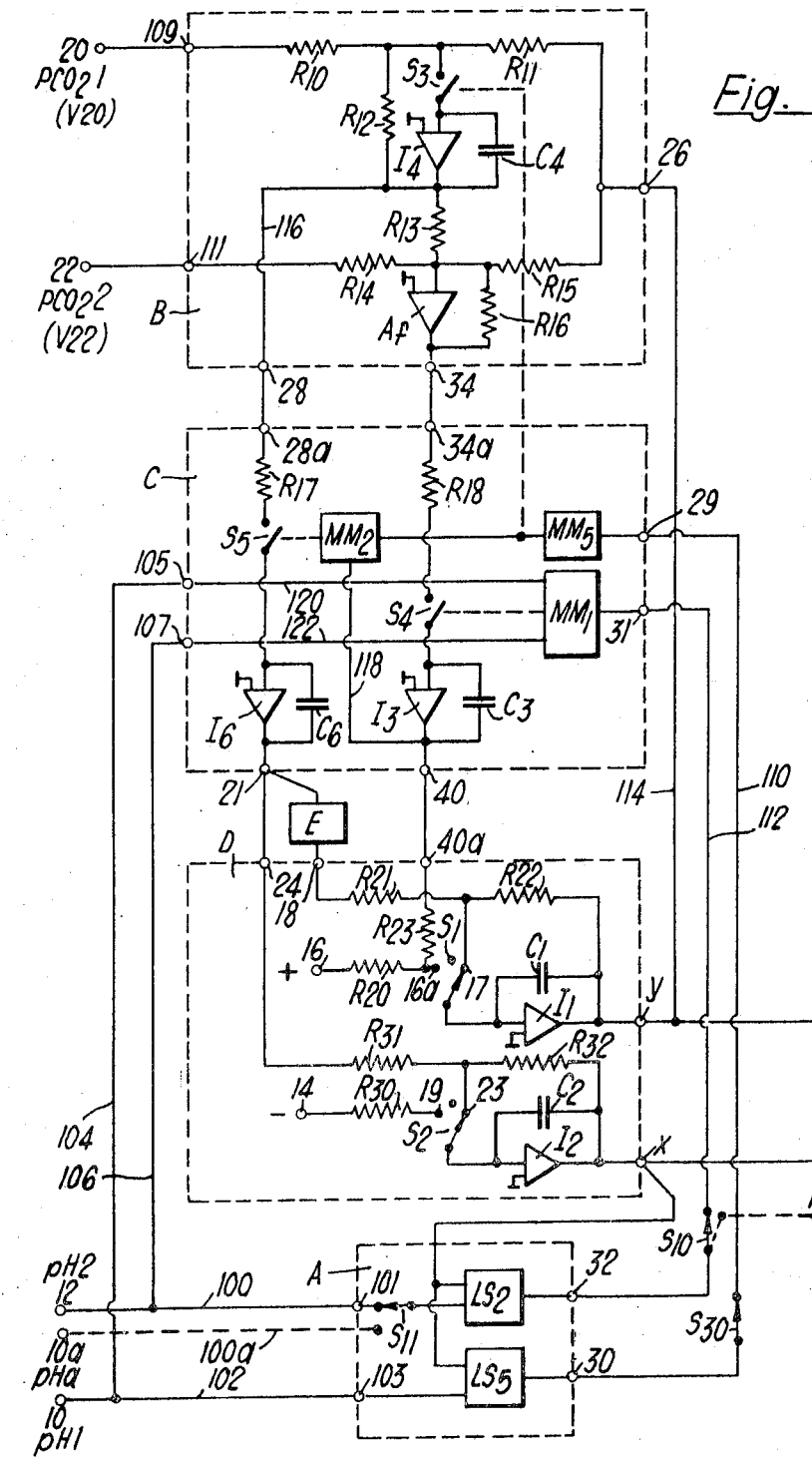
FIG. 7 is a more detailed diagram of a part of the apparatus of FIG. 4.
Figure 9:
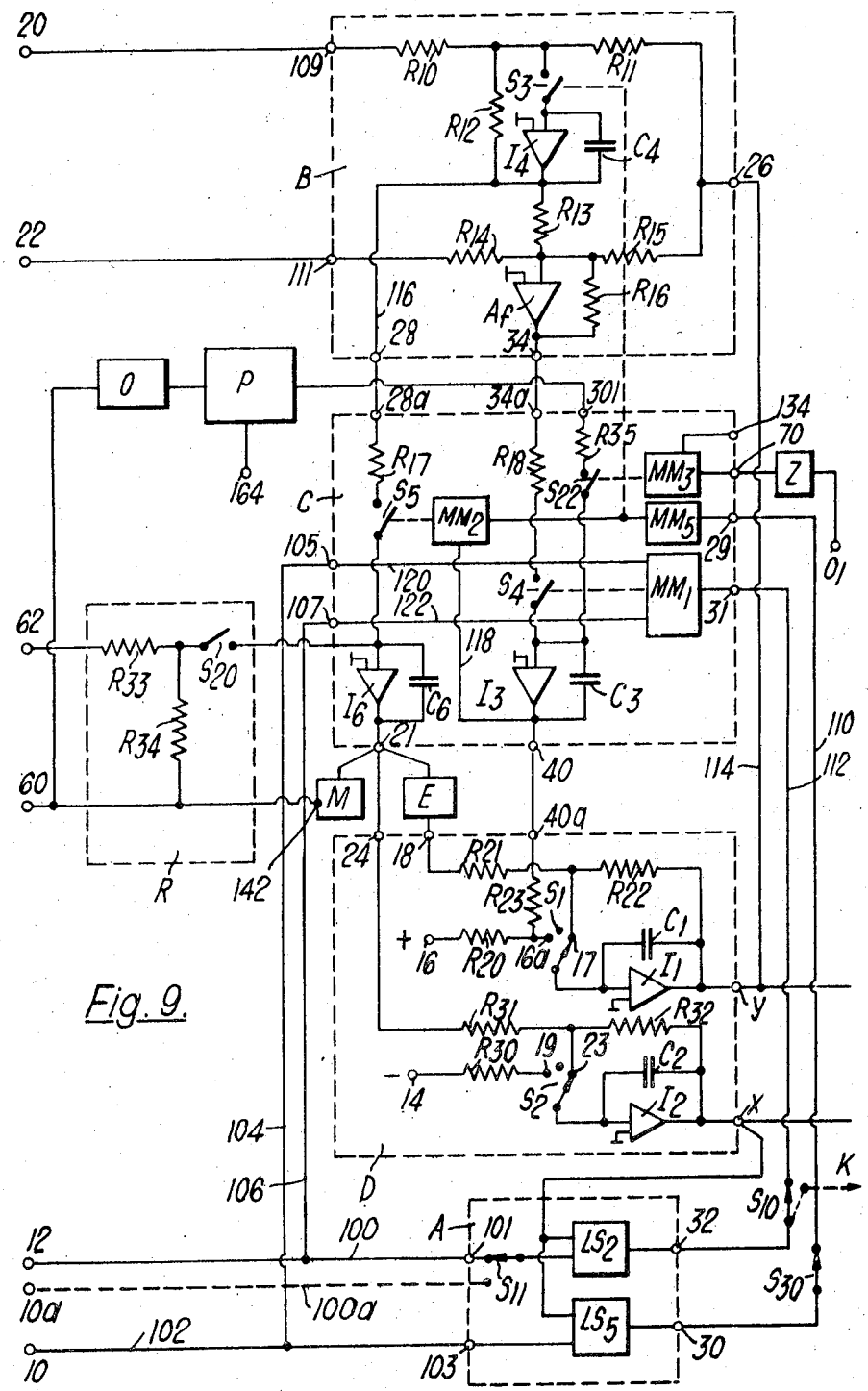
FIG. 9 is a diagram illustrating the apparatus of FIG. 7 with further facilities added thereto.
Figure 14:
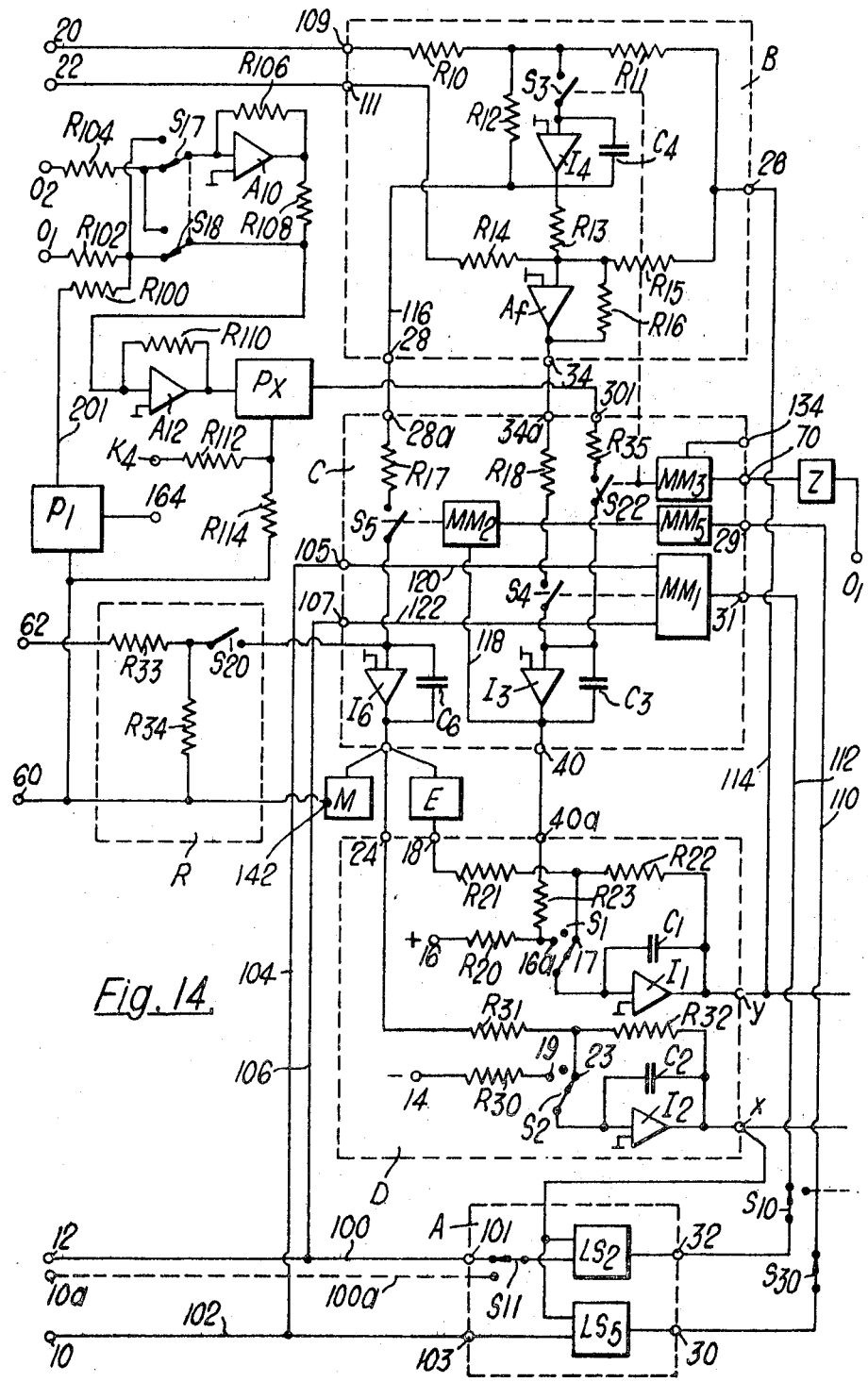
FIG. 14 is a modification of the arrangement of FIG. 9.

It makes the following calculations easier to understand if it is presumed that the value of the resistors on FIGS. 7, 9 and 14 fulfil the following relationships $R_{10} = R_{11} = R_{12}$; $R_{13} = R_{14} = R_{15} = R_{16}$; $R_{21} = R_{22}$; $R_{31} = R_{32}$; and $R_{33} = R_{34}$. However many other combinations are usable without changing the principles of the system.

The output voltages $V_x$ and $V_y$ can hereby in principle be expressed by $$V_x = -V_{(24)} + \frac{Va}{\tau} \times t \text{ and } V_y = -V_{(18)} - \frac{V_a + V_{(40)}}{\tau} \times t$$

from which it appears that $V_x$ and $V_y$ are voltages varying with time from the starting values $-V_{(18)}$, $-V_{(24)}$ which represent a point in the coordinate system. Since also the point 18 is connected with the network C, i.e. with its output terminal 21 through the network E, the initial values are not completely arbitrary but are governed by the correlated analog voltages $V_{(10)}$, $V_{(20)}$ and $V_{(12)}$, $V_{(22)}$ which are read into the apparatus. In order to explain this it must first be observed that the analog pH values which in the embodiment of the apparatus described correspond to the abscissa of the coordinate system are applied to the input terminals 10 and 12 of the network A which includes the two limit sensors LS$_2$ and LS$_5$ both of which have an input which is connected with the output x from the integrator I$_2$, C$_2$ from which the variable voltage $V_x$ is supplied.

This results in a pulse on the output 30 when $V_x$ becomes equal to $V_{(10)}$ and a pulse on the output 32 when $V_x$ becomes equal to $V_{(12)}$.

These pulses are through lines 110 and 112 applied to the input terminals 29 and 31 of the network C.

The network B is a subtraction and memory network. The switch S of the memory is actuated by means of the multivibrator MM$_5$ in the network C, when the latter is supplied with a pulse on the input 29, i.e. when $V_x$ becomes equal with $V_{10}$. Hereby the switch S$_3$ is closed and the voltage on the output 28 of the network is changed to: $V_y/R_{11} + V_{20}/R_{10}$ . $R_{12}$ which is stored on C$_4$ when S$_3$ is opened again.

Assuming that the voltages $V_x$ and $V_y$ initially vary in such a manner to be represented by the line LN$_2$ shown in dotted lines in FIG. 5 which has a different starting point b and a different slope than the desired line LN through the two points A and B the voltages $V_y$ will assume the value $V'_y$ when $V_x$ becomes equal with $V_{(10)}$ and the value $V''_y$ when $V_x$ becomes equal with $V_{12}$. The network B is so constructed that after the switch S$_3$ has been opened again, the output voltage on the terminal 28 is $\Delta V'_y = -V'_y - V_{20}$ and at the moment when $V_x = V_{(12)}$ the voltage on the terminal 34 is $\Delta V''_y - \Delta V'_y$ where $\Delta V''_y = -V''_{(22)}$ and $V_{22} = -V_y(PCO_2)$.

The network B includes the amplifier I$_4$ connected in series with an operational amplifier A$_f$ to operate as a subtraction network with a built-in analog memory as it will be apparent to those skilled in the art from the circuit shown without any additional explanation.

In the network C the integrator I$_3$ is operable to correct for the slope of the line and the integrator I$_6$ is operable to correct for the initial voltages.

The processing of the voltages from the outputs 28 and 34 results through the integrator I$_6$ in a change of the voltages at the terminals 18 and 24 which determine the initial conditions of the integrators I$_1$ and I$_2$, i.e. changes the location of the starting point b; and the processing through the integrator I$_3$ results in change of the ratio between the voltages of the points 16 and 14 so as to thereby vary the slope of the line, i.e. the ratio $dV_x/dV_y$.

To this purpose the output terminal 30 from the limit sensor LS$_5$ of the network A on which a pulse is produced when $V_x$ becomes equal to $V_{10}$ is connected through the multivibrator MM$_5$ to the multivibrator MM$_2$ which in its turn is controlled from the output of the integrator I$_3$ through the line 118.

In a similar manner the output terminal 32 of the limit sensor LS$_2$ is through the input terminal 31 of the network C connected with the multivibrator MM$_1$ which is controlled by the voltages $V_{(10)}$ and $V_{(12)}$ through lines 104 and 106.

The limit sensors LS$_5$ and LS$_2$ are rendered effective with LS$_5$ operative first.

When $V_x$ becomes equal with $V_{(12)}$ the multivibrator MM$_1$ closes the switch S$_4$ for a time which is governed by the time it has taken $V_x$ to increase from $V_{(12)}$ to $V_{(10)}$ which can be expressed by $t = (\tau/V_{(10)} - V_{(12)})$ where $\tau$ is a constant. This equation can be obtained if the internal capacitor in MM$_1$ is energized by a current proportioned to $V_{(10)} - V_{(12)}$.

During the time interval when the switch S$_4$ is closed, current is allowed to flow from the terminal 34 through the resistor R$_{18}$ to charge the capacitor C$_3$ of the integrator I$_3$.

As mentioned hereinbefore $t = (\tau/V_{(10)} - V_{(12)})$ and $V_{(34)} = \Delta V''_y - \Delta V'_y$.

The current allowed to flow from the terminal 34 is $i_{(34)} = (V_{(34)}/R_{18} = \Delta V''_y - \Delta V'_y/R_{18}$ The voltage increase at the terminal 40 is determined by $\Delta V_{(40)} = t \cdot i_{(34)} \cdot 1/C_3$ and by inserting the values for $t$ and $i_{(34)}$ herein it is found that $\Delta V_{(40)}$ will be $$\Delta V_{(40)} = \frac{\Delta V_y'' - \Delta V_y'}{V_{(10)} - V_{(12)}} \cdot \frac{\tau}{R_{18} \cdot C_3}$$

Obviously the voltage at the point 16a is hereby changed and with the left hand position of the switch S$_1$ a changed $V_y$ will be generated being $V_{y1} = -V_{18} - (V_a + V_{(40)} + \Delta V_{(40)}/\tau) \cdot t$ which corresponds to a line with a changed slope nearer to the slope of the desired line.

In a similar manner when $V_x$ becomes equal with $V_{(10)}$ a pulse from the limit sensor $LS_5$ is applied to the multivibrator $MM_5$ and $MM_2$, and $MM_2$ which closes the switch $S_5$ during a short time interval which is governed by the output voltage $V_{(40)}$ through the line 118 which can be expressed by $t' = (\tau/V_{(40)})$ or oppositely proportional with the slope of the line. Hereby the voltage on the output terminal 21 is changed. This terminal is directly connected with the terminal 24 in the network D and the changed potential of the point 24 changes the abscissa value of the starting point.

After the procedure here described the switches $S_1$ and $S_2$ are again shifted to the right hand position. The shifting of these switches is controlled from the control network K.

The terminal 18 of the network D which determines the ordinate value of the starting point is connected with the terminal 21 through a function generator E which operates to change the potential at the terminal 18 differently from the change at the terminal 24, i.e. in such a manner that the voltages at the terminals 18 and 24 vary according to a curve which we have discovered and which means in the following will be referred to as the hemoglobin curve.

In the SA nomogram a buffer base curve is included in addition to the base excess curve for intersection with the pH/logP-$CO_2$ lines for enabling reading out of the BB and a hemoglobin scale is included along a part of the BB curve extending approximately between 44 and 54 me 1 BB and indicating hemoglobin from zero to 25 grammes per 100 ml. The instructions to use the SA nomogram specify that in order to find $PCO_{2act}$ a new and more alkaline line to the right of the original should be established by applying an alkaline correction on both the buffer base and base excess scales and the correction is given as the same formula quoted hereinabove.

We have now found that different blood samples with different pH/logPCO$_2$ lines but with same hemoglobin have the pH/logPCO$_2$ lines intersecting at so small areas way outside the sheet on which the SA nomogram is normally printed that each of these areas of intersection is small enough to be considered as a point and that all these points follow a curve which we have dubbed the hemoglobin curve and which is referred to by HbC in FIGS. 5 and 6.

In the construction of the apparatus we use this curve e.g. we adjust the initial values of the two voltages which vary as a function of time to correspond to a point on this curve. This has the advantage that we have non-linear correction for the initial voltage which is a function of the hemoglobin and that we always have at one point in the circuits a pair of analogous voltages which represent the hemoglobin and can be read out, or alternatively the hemoglobin can be measured and the analog voltage can be read into the apparatus as one point instead of one set of correlated pH, PCO$_2$ values.

The presence of a Hb value also has the advantage that a function of Hb can be directly derived and used to correct for the slope of the line from LN to LA as shown in FIG. 6.

With the function generator E between the terminals 21 and 18 operating to imitate the curve HbC the voltage at the terminal 18 will be the ordinate of the curve and the voltage at the terminal 21 is the abscissa.

As apparent from the foregoing explanation the network C is a division network which processes the voltage differences supplied from the subtraction network B and changes the voltage in the point 40a which changes the ratio between $V_y$ and $V_x$ and thereby the slope of the line, because only $V_y$ is a function of $V_{40a}$.

In addition the voltages at the terminals 18 and 24 have been changed and represent the ordinate and abscissa respectively of the starting point and this change follows the hemoglobin curve HbC.

This means that the next time the switches $S_1$ and $S_2$ are shifted to their left hand positions the initial conditions will be nearer to the desired operating conditions. As mentioned the initial conditions will usually not be completely arbitrary because the apparatus when during intervals between use will remain with a charge on the various capacitors and thereby with an "interior" initial condition corresponding to the data which were read into the apparatus the last time it was used.

In practice the terminals 26 and 34 of the subtraction network B as well as the terminal 22 are connected with input terminals 27 and 35 of a network J (FIG. 4) which includes means for comparing the differences and in response to differences above predetermined values to repeat the signal to the control circuit K to operate the switches $S_1$ and $S_2$ so as to repeat the processing of the voltage differences and thereby the correction of the initial conditions as well as the slope a number of times until the comparison measuring circuit of the network J registers differences below predetermined values.

When this stage has been reached, the initial conditions as well as the slope are within narrow predetermined limits of the desired operating conditions as determined by the data read into the apparatus; as a further safeguard, however, we prefer to provide the network K with a repetition device which after the predetermined small difference has been found repeats the procedure a number of times, for example three times before the apparatus is left in the state ready for use, i.e. with the switches $S_1$ and $S_2$ in the middle position.

At this stage, the apparatus is programmed for actual use, the function generators F and H (FIG. 4) are "programmed" so that the actual operational state the output from the function generator F corresponds to the ordinate value of the BE curve and the output from the function generator H is a combined function of the abscissa and ordinate values of the BEC curve corresponding to the graduations along the base excess curve.

As it will be appreciated, the programming technique employs a proximity method which includes calculating one difference between one of the voltages which varies with time and one of the correlated actual values read in, i.e. $V_{(20)}$ at the time when the other variable voltage assumes the value of the first correlated other value read in, i.e. $V_x = V_{(10)}$ and processing this difference in response to the ratio between the changes of the two variable voltages as well as in response to a function, i.e. the HbC curve to approximate the initial values of the variable voltages to desired values; and at the same time calculating the difference between the above mentioned difference and a corresponding difference i.e. between $V_y$ and $V_{(22)}$ at the time when the other variable voltage assumes the value of the second one of the other correlated voltages read in, i.e. $V_x = V_{(12)}$ and processing this difference, i.e. $\Delta V''_y - \Delta V''_y$ in response to the corresponding differences in value of the other voltages read in, i.e. $V_{(12)} - V_{(10)}$ to approximate the ratio of variation between the two variable voltages to the desired ratio as governed by the ratio between the correlated values read in, i.e. $V_{(10)}$, $V_{(20)}$ and $V_{(12)}$, $V_{(22)}$ respectively.

As explained hereinbefore with reference to FIGS. 4, 6 and 8, most of the calculations of the desired data require a correction according to formulae which include the value of hemoglobin or a function thereof and there is no simple way of determining the BB unless the Hb is known. The discovering of the hemoglobin curve and the utilization of this discovery in the construction of the apparatus according to the invention is therefore a valuable contribution to the art. It enables the analog value of the hemoglobin to be read out and applied to the input $I_h$ of the network $AM_3$ to obtain the BB without having measured the Hb, i.e. without laboratory work and it enables the necessary correction of the ratio between the variable voltages, i.e. correction of the slope of the line to be made in a simple manner merely by swinging the line about the point on the HbC curve from where it starts.

In practice the hemoglobin curve is constructed on paper by drawing a sufficient number of intersecting pH/logPCO$_2$ lines for different blood samples having the same hemoglobin in grams per 100 ml. The hemoglobin curve can thereafter be drawn through the points of intersection of these different lines.

Figure 11:
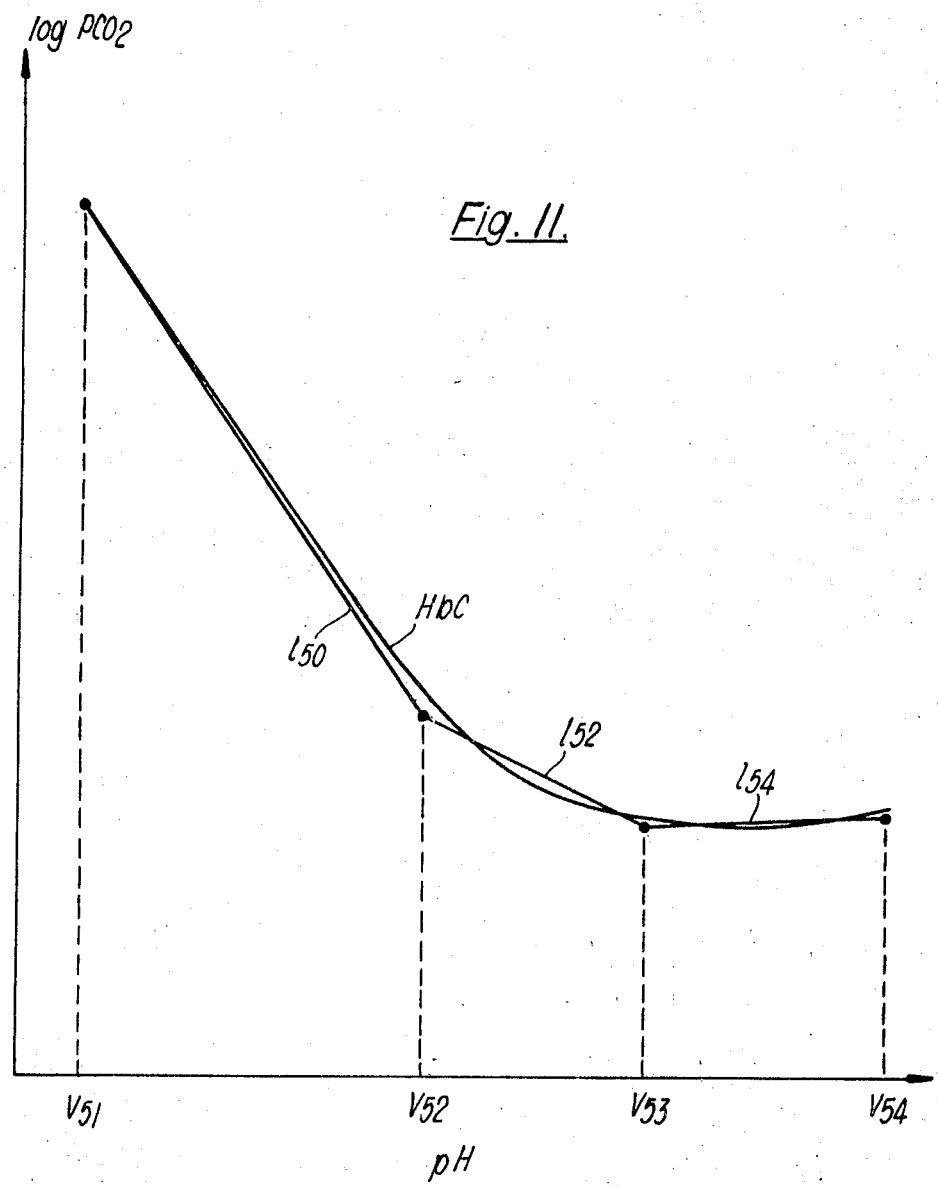
FIG. 11 is a curve illustrating a geometric locus which will be referred to as the hemoglobin curve and illustrates a method of approximing this curve.

The hemoglobin curve has a shape substantially as shown in FIG. 11. Each point of the hemoglobin curve corresponds to a set of values of pH and PCO$_2$.

Figure 13:
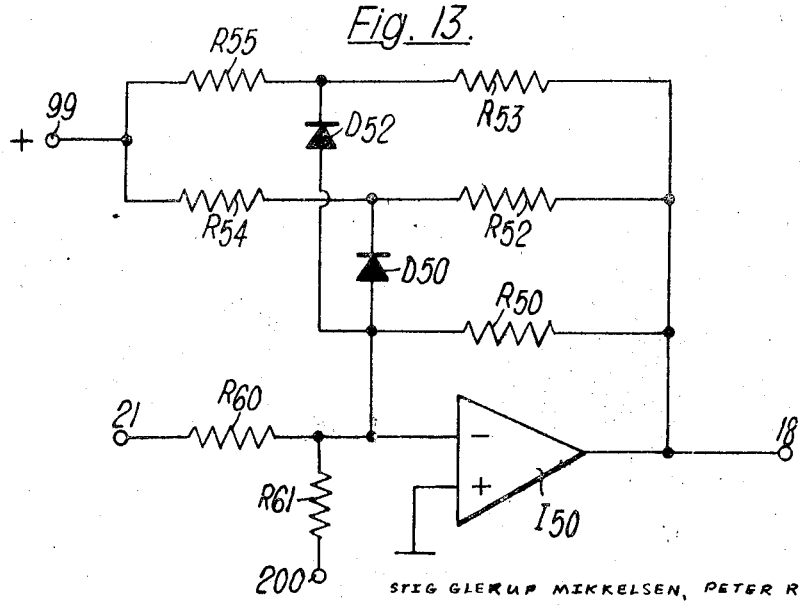
FIG. 13 is a schematic illustration of a function generator to simulate the hemoglobin curve of FIG. 11.

In order to produce as a function of the abscissa value the ordinate value of the hemoglobin curve to be applied to the terminal 18 of FIG. 7 as hereinbefore explained, a function generator substantially of a construction as indicated in FIG. 13 is used.

The terminal 21 is through a resistor $R_{60}$ connected to the inverting input of an operational amplifier $I_{50}$.

A reference voltage connected to a terminal 99 supplies voltage dividers $R_{55}$, $R_{53}$, and $R_{54}$, $R_{52}$ respectively. One resistor $R_{50}$ is connected directly across the operational amplifier $I_{50}$ and diodes $D_{50}$, $D_{52}$ are connected from the left hand end of the resistor $R_{50}$ the tapping points of the voltage dividers. Another reference voltage is connected to a terminal 200 supplies a current to the inverting input terminal of the amplifier $I_{50}$ through a resistor $R_{61}$ so as to provide a positive output voltage when the input voltage on the terminal 21 is zero.

When the input voltage on the terminal 21 increases from the value $V_{51}$ to $V_{52}$ only the resistor $R_{50}$ is effective, and the output voltage 18 varies in accordance with the input voltage according to a straight line $l_{50}$. When the input voltage reaches the value $V_{52}$ the diode $D_{50}$ becomes conductive, and during the increase of the input voltage from the value $V_{52}$ to the value $V_{53}$ the output voltage follows the straight line $l_{52}$ of FIG. 11, the slope of which is determined by the values of the resistors $R_{50}$ and $R_{52}$.

When the input voltage reaches the value $V_{53}$, also the diode $D_{52}$ becomes conductive, and during the increase of the input voltage from the value $V_{53}$ to the value $V_{54}$ the output voltage follows the straight line $l_{54}$, the slope of which is determined by the three parallel resistors $R_{50}$, $R_{52}$ and $R_{53}$.

Function generators of this type are well known in the art, and the manner in which the values of the resistors can be calculated to imitate a good proximation of non-linear functions is well known in the art and will therefore not be explained further.

Figure 12:
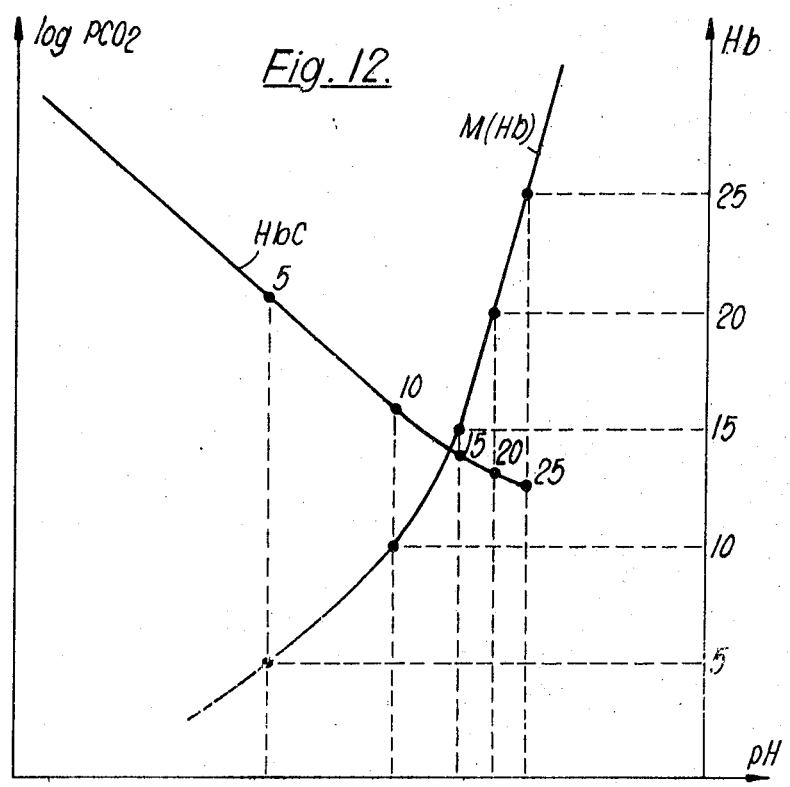
FIG. 12 shows the hemoglobin curve and illustrates how to plot a curve from which the actual hemoglobin values can be derived.

In FIG. 12 the hemoglobin curve HbC is shown indicating the graduations along the curve with values of hemoglobin for 5, 10 15, 20 and 25 grammes per 100 ml.

In order to obtain these exact values we construct an alternative curve by drawing lines from the abscissa axis through each of these points and plotting the hemoglobin values along a vertical scale and drawing lines parallel with the abscissa axis from each of the ordinary values to points of intersection with the vertical lines and then drawing another curve marked M(Hb) which is an expression for the hemoglobin value.

Obviously, by drawing a plurality of straight lines to approximate the shape of the curve M(Hb) and constructing a function generator in similarity with that of FIG. 13 it is possible to obtain the actual hemoglobin values out in a similar manner. This function generator will correspond to the function generator M of FIGS. 4 and 9.

It will be appreciated that the function generators F and H are constructed in a similar manner by starting with a graphical illustration of the base excess curve and converting this graphical illustration into a curve which represents the actual values of base excess as function of pH and $\log PCO_2$.

No further description of such function generators will be given because the technique is described in the technical literature, e.g. Analog and Digital Computer Technology by Norman R. Scott, McGraw-Hill Book Company, Inc, 1960, Chapter 3: Computer Representation of Nonlinear functions — especially 3.3. Function Approximation and 3.4. Some types of approximate function generators; also Wireless World, Dec. 1967, pp 591–598, "Diode Function Generators" by A.E. Crump.

Reverting to FIG. 6, we have discovered that the change of slope of the line from LN to LA can be expressed by the formula: $\Delta L = (K_1/K_2 - BE_{100}) \cdot (100 - SO_2) \cdot F_{(Hb)}$ where $K_1$ and $K_2$ are constants and $F_{(Hb)}$ a function of the hemoglobin.

The hemoglobin curve HbC can best be characterized as the geometric locus for intersecting pH/logPCO$_2$ lines for different blood samples having the same hemoglobin in grammes per 100 ml.

The arrangement of FIG. 9 differs from the arrangement of FIG. 7 in that it includes facilities for reading out the actual analog value of the hemoglobin Hb and also reading in the actual value of the hemoglobin as well as means for correcting the slope of the line according to the above mentioned formula.

To this purpose the output terminal 21 from the integrator $I_6$ is in addition to its connection with the function generator E connected with the function generator M, the output terminal of which is designated by 142.

As explained in the foregoing the function generator E was so designed that the output supplied to the terminal 18 represents the ordinary value of the hemoglobin voltage.

The function generator M is as with the function generator H of FIG. 4 designed to provide the actual analog hemoglobin voltage values with reversed sign, i.e. to represent the graduation along the hemoglobin curve.

The output terminal 142 of the function generator M is connected with the terminal 60. Obviously, thereby the actual hemoglobin value can be read out from the terminal 60.

In addition, the terminal 60 is connected with the input of a function generator 0 in which a function of the hemoglobin value is provided corresponding to the function which is used in the formula hereabove mentioned.

In FIG. 9, this function is supplied to a network P which is a multiplication network having an input terminal 164 to which $100 - SO_2$ is supplied. Hereby the output of the network P is equal to the product $(100 - SO_2) \cdot F_{(Hb)}$. This product is applied to a resistor $R_{35}$ in series with a switch $S_{22}$, the other end of which is connected with the input of the integrator $I_3$, $C_3$.

The switch $S_{22}$ is closed by means of a monostable multivibrator MM$_3$, which is triggered by means of a trigger input from the control network K supplied to an input terminal 134. The time during which the switch $S_{22}$ is closed is inversely proportional with the difference $K_2 - BE$. This difference is produced in a network Z to the input of which $BE_{100}$ is applied.

The network R includes two resistors $R_{33}$ and $R_{34}$ of which the resistor $R_{33}$ in series with a switch $S_{20}$ is connected with the input terminal 62 to which the analog hemoglobin value is applied when the hemoglobin is known and the hemoglobin point is used instead of a correlated set of pH and PCO$_2$ values as will be described later.

By making the values of the resistors $R_{33}$ and $R_{34}$ equal it will be understood that when the system is in balance so that when the current at the input of the integrator $I_6$ is zero, the output voltage at the terminal 21 will correspond to the abscissa value of the hemoglobin point on the hemoglobin curve, when the voltage on the terminal 62 is equal to the analog hemoglobin value.

As will be apparent from the foregoing description of FIG. 9, the remaining parts of which correspond to the circuit of FIG. 7 and referred to by the same reference numerals the circuit of FIG. 9 provides for the correction of the slope of the line from SL to LA in accordance with the above indicated formula.

In addition to $BE_{100}$ and $BE_{act}$ which both are related to a blood sample there is a further factor called base excess in vivo which it is desired to calculate. In the living organism there is approximately three times as much fluid as in the blood which means that the entire organism will react upon changes of the acid base status corresponding to a blood sample in which there is only about one third amount of hemoglobin.

The built-in HbC curve also provides for this facility by using a procedure illustrated in FIG. 10 by changing the starting point $a$ of the line LA along the HbC curve to a point $a_1$ which corresponds to about one third of the Hb value and then by using the technique described starting from this point draw a line $L_{Hv}$ through the point $d$ which corresponds to pH$_{act}$ and PCO$_{2act}$.

Very often a fixed Hb value of about 6 grams per 100 ml. is selected instead of the Hb value in the calculation of base excess in vivo.

The circuit of FIG. 14 is a modification of the circuit of FIG. 9 and is based on the following observations.

We have already indicated before that $$BE_{act} = BE_{100} + K_6 \cdot Hb \cdot (100 - SO_2) \quad (1)$$

and that the change of the slope of the line referred to as $\Delta L$ can be expressed by the formula $$\Delta L = (K_1/K_2 - BE_L) \cdot (100 - SO_2) \cdot F_{(Hb)} \quad (2)$$

where $BE_L$ is the base excess value corresponding to the line with the slope L starting at the point on the Hb curve corresponding to the actual Hb value.

We have now made the discovery that $F_{(Hb)}$ with a good approximation can be expressed by the formula $$F_{(Hb)} \cong K_5 \cdot Hb \cdot (Hb + K_4) \quad (3)$$

By inserting the formulas (1) and (3) in formula (2) it can be found that $$\Delta L = \frac{K_1}{K_2 - BE_L} \cdot \frac{BE_{act} - BE_{100}}{K_6 \cdot Hb} \cdot K_5 \cdot Hb \cdot (Hb + K_4) \quad (4)$$

and by reducing this formula that $$L = (Hb + K_4) \cdot \frac{K_7}{K_2 - BE_{100}} \cdot (BE_{100} - BE_{act}) \quad (5)$$

With $BE_{100}$ and $Hb$ constants and are $BE_{act}$ and $\Delta L$ variable then equation (5) gives $$\frac{d(BE_{act})}{d(\Delta L)} = \frac{d(BE_{act})}{dL} = \frac{d(BE_L)}{dL} = -\frac{K_2 - BE_L}{K_7(Hb + K_4)} \quad (6)$$

The value of $BE_{act}$ is obtained by means of a multiplication network $P_1$, which is connected with the terminal 60 from which the analog hemoglobin value is supplied and to which through an input 164 the value $(100 - SO_2)$ is supplied.

The output from this network on the line 201 is through the resistor $R_{100}$ connected to the end of the resistor $R_{102}$ remote from the terminal $O_1$ and to the switches $S_{17}$ and $S_{18}$. Obviously, at this point of connection a signal is applied being equal to $BE_{act}$.

When the switches $S_{17}$ and $S_{18}$ are in their lower positions a current equal to $BE_{act}$ is supplied to the input terminal of an amplifier $A_{12}$ together with the current through a resistor $R_{108}$. The resistor $R_{108}$ is connected to the output of an amplifier $A_{10}$ which is shunted by a resistor $R_{106}$. The input of this amplifier is connected to the end of the resistor $R_{104}$ remote from the terminal $O_2$. The resistors are so dimensioned that $$R_{104} = R_{102} (R_{106}/R_{108})$$

and the current to the input terminal of $A_{12}$ is equal to zero when the voltage on the terminal $O_2$ is equal to $BE_{act}$.

The circuit is so constructed that the amplifier $A_{12}$ is the input amplifier of a servosystem which is controlling the slope of the line represented by $V_x$ and $V_y$ and having the voltage on terminal $O_2$ as the output signal. The servosystem is a sampled data servosystem which obtains one sample from each line drawn by the circuitry, basically, the same type of proximity system as previously described for placing the line in the hypothetical coordinate system, just using base excess differences as input information instead of $\log PCO_2$ differences. Such a servosystem will regulate its input current to almost zero, so this arrangement will after a number of samples result in a voltage on terminal $O_2$ being equal to $BE_{act}$. When this voltage is obtained, the switch $S_7$ in FIG. 8 is opened and the value of $BE_{act}$ is hereby stored in the memory $AM_2$.

To get an effective servosystem it is required that the loop-gain of the system has a certain almost constant value. Since the output on any one of the terminals $O_1$ or $O_2$ is governed by the ratio between the two voltages which vary as a function of time i.e. by the slope of the line in the nomogram is the ratio $dBE_L/dL$ given by the equation (6), which again means that the gain from terminal 40 to terminal $O_2$ is proportional to $(K_2 - BE_L/Hb + K_4)$ To obtain a constant value of the loop gain, it is therefore required that gain from terminal $O_2$ to terminal 40 is proportional to $$Hb \mp K_4/K_2 - BE_L$$

To fulfil this requirement the multiplication network $P_x$ is introduced. One input of this network is connected with the output of an amplifier $A_{12}$, and a second input is connected with the resistors $R_{112}$ and $R_{114}$, while the output of the network $P_x$ is connected with the upper end of the resistor $R_{35}$, to which the network P is connected in the previously described embodiment. The voltage supplied from the resistors $R_{112}$ and $R_{114}$ is equal to $(Hb + K_4)$ such that the voltage on terminal 301 hereby is proportional to $(Hb + K_4)$.

The monostable multivibrator $MM_3$ closes the switch $S_{22}$ during a time that is inversely proportional with $K_2 - BE_L$ as described earlier. Each time $MM_3$ is triggered from the network K, the voltage on the terminal 40 will change with an amount proportional to $1/K_2 - BE_L$. The signal from terminal $O_2$ to terminal 40 passes through the linear network comprising the amplifiers $A_{10}$ and $A_{12}$ and their associated resistors, the multiplier $P_x$, the resistor $R_{35}$, the switch $S_{22}$, and the integrator $I_3$. Therefore the gain from the terminal $O_2$ to the terminal 40 is proportional to $Hb + K_4/K_2 - BE_L$.

In other modes of operation $BE_{act}$ is a constant value and $BE_{100}$ is the wanted value. The servosystem described above can also be used for these modes of operation presupposing that the signs of the signals from the terminals $O_1$ and $O_2$ are changed. From equation (5) it can be seen that when $BE_{100}$ becomes a variable instead of $BE_{act}$ a change of sign must be made, otherwise the servo loop will get a positive feedback instead of a negative one. This change of sign is obtained by moving the switches $S_{17}$ and $S_{18}$ to their upper position.

As apparent from the foregoing description the analog computer operates in such manner that when the input data has been made available in the form of analog values corresponding to the correlated values of pH and $PCO_2$ the computer generates its own voltages and, as a standard procedure, goes through the comparison between one of the voltages which varies along a substantially linear function and the voltage which simulates the base excess curve and maintains the base excess value when the limit sensor G of FIG. 4 indicates that the ordinary values of the two voltages have become equal.

As indicated hereinbefore the opening and closing of the various switches is controlled from the control unit K of FIG. 4.

Figure 15:
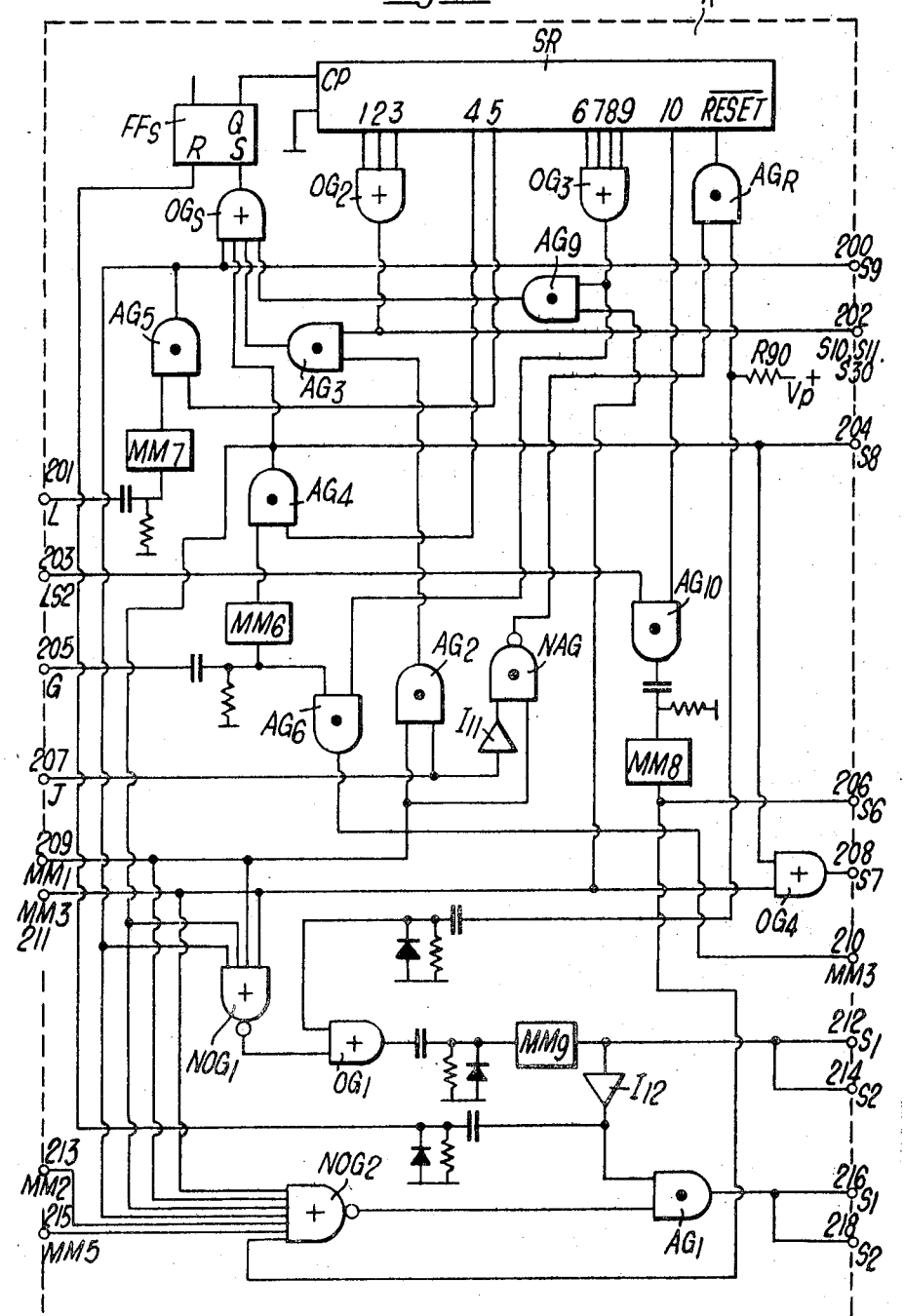
FIG. 15 is a diagrammatic illustration of a control network included in the arrangements of FIGS. 4 and 9.
Figure 16:
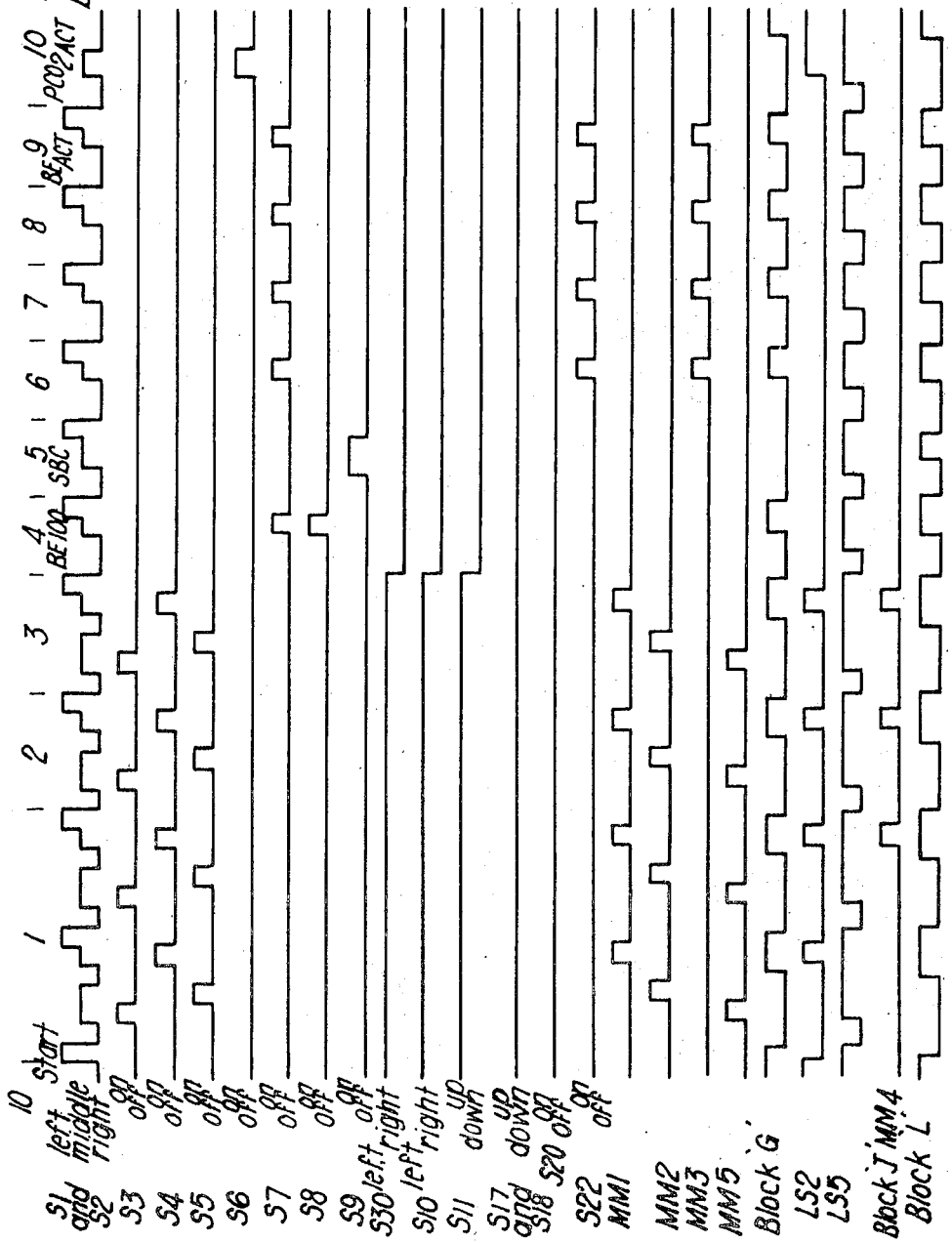
FIG. 16 is an impulse diagram illustrating the operation of the arrangement of FIG. 15.

The basic construction of the control unit and the manner in which it operates will appear from FIG. 15 which is a schematic diagrammatic illustration of the control unit and from FIG. 16, which is a corresponding impulse diagram for the operation of the computer. The following description of the control unit is based on the use of positive logic.

The control circuit of FIG. 15 comprises a shift register SR in connection with a triggering flip-flop $FF_s$, i.e. a bistable circuit.

The shift register and the triggering flip-flop are through a system of gates which will be described more fully in the following connected with a plurality of inputs and a plurality of outputs.

The inputs all of which are shown at the left hand side of FIG. 15 are an input terminal 201 which is connected with the limit sensor L of FIG. 4, an input 203 which is connected with the limit sensor $LS_2$ of FIG. 7. In addition one input 205 is connected with the limit sensor G of FIG. 4 and an input 207 is connected with the block J of FIG. 4 which also operates as a limit sensor and comparator.

Eventually, two inputs 209 and 211 are connected with each one of the multivibrators $MM_1$ and $MM_3$ of FIG. 9 and two other inputs 213 and 215 are connected to each one of the monostable multivibrators $MM_2$ and $MM_5$.

The outputs which are shown at the right hand side of FIG. 15 comprise an output 200 which opens the switch $S_9$ of the network $AM_6$ of FIG. 8 when a logical "1" is applied on the output 200.

A further output terminal 202 actuates the switches $S_{10}$, $S_{11}$ and $S_{30}$ of FIGS. 7 and 9 and keeps these switches in the position shown in full lines in the respective figures.

Further output terminals 204, 206, and 208 are operatively connected with the switches $S_8$, $S_6$ and $S_7$ of the networks AM$_1$, AM$_4$ and AM$_2$, respectively of FIG. 8 and open these switches in response to signal on the respective outputs.

An output 210 is connected with the multivibrator MM$_3$ of FIG. 9 to trigger this multivibrator when necessary.

Eventually, two pairs of outputs 212, 214, 216, 218 are provided operatively connected with the switches S$_1$, and S$_2$ of the integrators I$_1$ and I$_2$ of FIGS. 7 and 9, so as to throw both these switches on to the left hand position in response to signals on the outputs 212 and 214 and throw the switches over to the right hand position in response to signals on the outputs 216 and 218. In the case of no output on any of these four output terminals the switches S$_1$ and S$_2$ will remain in their "neutral" positions.

It will be appreciated that all the switches in question are electronic switches of any convenient conventionally available type.

The input 201 from the limit sensor L is through a monostable multivibrator MM$_7$ connected with an input of AND gate AG$_5$ which is connected to the output from stage 5 of the shift register ST. The output end of AND gate AG$_5$ is connected with an input of an OR gate OG$_s$ the output of which is connected with the trigger FF$_s$ to condition the set input of FF$_s$ in response to signal on any one of the inputs of the OR gate OG$_s$ In a similar manner, the output from position 4 of the shift register is connected with one input of an AND gate AG$_4$, the other input of which is connected with the input 205 via a monostable multivibrator MM$_6$ which in its turn is connected with the limit sensor G.

The outputs 1, 2 and 3 from the shift register SR are connected inputs of an AR gate OG$_2$ the output of which through an AND gate AG$_3$ is connected with one of the inputs of the OR gate OG$_s$.

The other input of the AND gate AG$_3$ is connected with an output of an AND gate AG$_2$ having one input connected with the terminal 207 from the block J and another input connected with the input 209.

The outputs 6, 7, 8 and 9 of the shift register SR are connected with the inputs of an OR gate OG$_3$, the output of which through an AND gate AG$_9$ is connected with one of the inputs of the OR gate OG$_s$. The output of the OR gate OG$_3$ is furthermore connected with the input of an AND gate AG$_6$, the other input of which is connected with the input terminal 205 from the limit sensor G. The signals from the terminal 205 are also routed through the multivibrator MM$_6$ to the input of an AND gate AG$_4$, the other input of which is connected with the output from position 4 of the shift register.

The input 207 from the block J is in addition through an inverter I$_{11}$ connected with the input of a NAND gate NAG the other input of which is connected with the input 209 from the multivibrator MM$_1$ and the output of which is connected with one input of an AND gate AG$_R$ which is connected with a reset terminal of the shift register SR.

The other input terminal of the AND gate AG$_R$ is via a resistor R$_{90}$ connected with a voltage supply V$_p$ and it is also connected with the input of an OR gate OG$_1$. The output of this OR gate is connected with a monostable multivibrator MM$_9$. The other input of the OR gate OG$_1$ is connected with an output of a NOR gate NOG$_1$ which has two inputs connected with the input terminals 209 and 211, respectively and two other input terminals which are connected with the output terminals of the AND gates AG$_4$ and AG$_5$.

In addition, a second NOR gate NOG$_2$ is provided having four input terminals connected with the same terminals as the inputs of the NOR gate NOG$_1$ and in addition two further inputs connected with input terminals 213 and 215 which are connected with the two multivibrators MM$_2$ and MM$_5$ of FIG. 9.

The output of the NOR gate NOG$_2$ is connected with one input of an AND gate AG$_1$, the other input of which is connected with the output of the multivibrator MM$_9$ through an inverter I$_{12}$, and which at the same time is connected with the reset trigger terminal R of the flip-flop FF$_s$.

Eventually, the NOR gate NOG$_2$ has a further input terminal which is connected through a monostable multivibrator MM$_8$ to the output of an AND gate AG$_{10}$ of which one input is connected with the output No. 10 from the shift register SR and the other input is connected with the input terminal 203 from the limit sensor LS$_2$.

The output terminal 200 is connected with the output of the AND gate AG$_5$ and the output terminal 202 is connected with the output of the OR gate OG$_2$. The output terminal 204 is connected with the output of the AND gate AG$_4$. The output terminal 206 is connected with the output of the AND gate AG$_{10}$ through the multivibrator MM$_8$.

The output terminal 208 is connected with the input terminal 211 through the OR gate OG$_4$, the other input of which is connected to terminal 204 and the output of AND gate AG$_4$. The output terminal 210 is connected with the output of the AND gate AG$_6$.

Eventually, the output terminals 212 and 214 are connected with the output of the OR gate OG$_1$ and the output terminals 216 and 218 are connected with the output of the AND gate AG$_1$.

In the initial position of the arrangement of FIG. 15 the shift register SR is in position zero, and there is no signal on any of the input terminals.

When a switch (not shown) is momentarily activated, the multivibrator MM$_9$ is triggered via OG$_1$ and the signal is transmitted to the output terminals 212 and 214 with the result that the two switches S$_1$ and S$_2$ are thrown over to their left hand position.

As soon as the signal disappears again a logical 1 is applied to one input of the AND gate AG$_1$ through the inverter I$_{12}$. Since there are no input logical 1's on the NOR gate NOG$_2$ a second input logical 1 is also applied to the AND gate AG$_1$ with the result that an output logical 1 is supplied to the output terminals 216 and 218 with a result that the switches S$_1$ and S$_2$ are thrown over to their right hand position. During this stage, the limit sensor LS$_5$ triggers the multivibrator MM$_5$. As a result thereof an input logical 1 is supplied over the terminal 215 to one of the inputs of the NOR gate NOG$_2$, whereby one of the input signals to the AND gate AG$_1$ goes to logical O and thereby the output terminals 216 and 218 go to logical O which again results in bringing the two switches S$_1$ and S$_2$ into a neutral position.

In immediate continuation of the triggering of the multivibrator MM$_5$ the multivibrator MM$_2$ is triggered by the trailing edge of MM$_5$ as apparent from the time diagram of FIG. 16. This results through the input 213 on a signal on another one of the inputs of the NOR gate NOG$_2$ which also prevent a logical 1 on the output terminals 216 and 218 with the result that the switches S$_1$ and S$_2$ remain in their neutral position.

At the end of the MM$_2$ pulse, the output of NOG$_2$ is going back to the logical 1 position which again puts the output of AG$_1$ to logical 1. This causes via the terminals 216 and 218 the switches S$_1$ and S$_2$ to go to the right position. During this stage the limit sensor LS$_2$ will activate the multivibrator MM$_1$ which again will put S$_1$ and S$_2$ back in the neutral position via NOG$_2$, AG$_1$ and the terminals 216 and 218.

As previously explained with reference to the mode of operation of the arrangements of FIGS. 7 and 9 the two voltages initially produced will through the integrators I$_1$ and I$_2$ result in an output voltage on the terminals $x$ and $y$ and in the manner hereinbefore described these voltages will be processed and controlled by the signals from the limit sensors LS$_2$ and LS$_5$ in such a manner that the initial value of the two voltages as well as the ratio between the two voltages will be corrected to make sure that at a certain stage the voltages will be within desired limits of the voltages V$_{10}$, V$_{20}$ at one moment and V$_{12}$, V$_{22}$ at another moment.

This desired limit is determined by the limit sensing network J which is a differential network that measures the difference between the voltage at the point 34 and V$_y$ − V$_{22}$. When this difference becomes less than a predetermined value an output from the network J is provided on the input 207. As apparent from the time diagram of FIG. 16 this appears simultaneously with an occurrence of input from the multivibrator $MM_1$ on the input 209.

This provides simultaneous logical 1 on the two inputs of the AND gate $AG_2$. Hereby a second logical 1 is supplied to the input of the AND gate $AG_3$ in addition to the one coming from the OR gate $OG_2$. This again provides signals from the OR gate $OG_4$ which will set the flip-flop $FF_5$ so that the register SR will shift when the trailing edge of the next $MM_9$ pulse is transmitted through $I_{12}$ to the R input of $FF_s$.

When the signal on the input 209 goes to logical O the conditions are as previously described. An output signal from the NOR gate $NOG_1$ will trigger the multivibrator $MM_9$ and throw over the switches $S_1$ and $S_2$ to their left hand position. When thereafter this signal disappears and a logical 1 is caused on the output of the inverter $I_{12}$ this signal causes output on the terminals 216 and 218 as previously described and in addition thereto the delivery of a trigger signal to the flip-flop $FF_s$ which now shifts the register SR, because the trigger has been conditioned for shifting as described.

The limit sensing network J has been designed in such a manner that a signal is only provided on the input 207 when the magnitude of the variable voltages are within relatively narrow limits of the voltages $V_{10}$, $V_{20}$ and $V_{12}$, $V_{22}$, but as a safeguard the control network K has been designed in such a manner that the procedure hereinbefore described is repeated three times namely at the stages 1, 2 and 3 of the shift register which we have found to give sufficient accuracy.

If it happens that the output of block J to terminal 207 is a logical O when $MM_1$ is activated the register SR will be reset to the 1- position via $I_{11}$, NAG and $AG_R$ so that the circuit will work as if $FF_s$ has never been activated during this calculation.

When the shift register is shifted to position 4 this provides for logical 1 input on one of the inputs and the AND gate $AG_4$. When, as indicated in the time diagram, the limit sensor G provides an input on the input 205 this triggers the multivibrator $MM_6$ and provides a second logical 1 input on the AND gate $AG_4$ which results in output on the output 204 and thereby opening of the switch $S_8$ so as to memorize the value of $BE_{100}$ in the analog memory $AM_1$. At the same time the flip-flop $FF_s$ is conditioned for shifting the register SR. $MM_9$ is activated on the trailing edge of $MM_6$ via $AG_4$ and $NOG_1$.

In position 5 of the shift register logical 1 input is provided on the AND gate $AG_5$, and when from the limit sensor L an input is provided on the input 201, the multivibrator $MM_7$ is triggered and the output from the AND gate $AG_5$ is transmitted to the output terminal 200 and opens the switch $S_9$ in the network $AM_6$.

In a similar manner and in sequence the various desired data are supplied to the different analog memories and are stored therein.

The analog memories are through a system of selector switches operable by means of the selector panel RO of FIG. 1 or by the keyboard of FIG. 2 or in other convenient manner connected with the reading out equipment of FIG. 3 in the manner briefly described in connection with this figure, so as to enable individual display of selected ones of the analog output data for reading out thereof by means of a printer or in any other convenient manner which will not be described in more detail in as far as it is believed that those skilled in the art will be able to select the appropriate equipment for each desired case and provide the necessary interface as well as analog/digital converting equipment as necessary.

In the example hereinbefore described the analog computer is so designed that when the analog values of the known data have been read into the analog computer and produced therein the necessary analog voltages and the variable voltages have been appropriately adjusted to coincide in time sequence with the read in analog voltages, the analog computer automatically finds the first instance the base excess and thereafter calculates in predetermined sequence the other described data to be read out.

It will be appreciated that in the event that certain data are not desired the reading out selector panel can be provided with means for cancelling certain of the data or alternatively such cancellation means can be included in one of the networks to disconnect the computer from the corresponding one of the analog memories.

It will also be appreciated that it will be possible within the scope of the invention to provide the shift register of FIG. 15 with jumping facilities and to control the jumps by means of suitable control members to as to thereby vary the sequence of calculations or to enable specific calculations to be taken out directly of the register in accordance with a command.

A modification of the circuit of FIG. 7 with respect to the determination of the voltage in the point 16a is shown in FIG. 17.

In the circuit of FIG. 17 the input terminals 10 and 12a are connected with input terminals 10' and 12' of a summation network $D_1$. The voltages of the terminals 10 and 20 are as before $V_{10}$ and $V_{20}$ and the voltages at the terminals 12a and 22a are $-V_{12}$ and $-V_{22}$ whereby the difference $V_{(10)} - V_{(12)}$ is applied to one terminal of a switch $S_{15}$ and the terminals 20 and 22 are connected to input terminals 20' and 22' of another summation network which applies the difference $V_{(20)} - V_{(22)}$ to the other terminal of the switch $S_{15}$. The circuit includes two amplifiers $A_1$ and $A_2$ in series with a switch $S_{16}$ between the amplifier and a terminal 14a to which a negative voltage is applied equal to the negative voltage of the point 14. $L_t$ is a light source and PR a light sensitive resistor With the switch $S_{15}$ in the position shown in full lines and the switch $S_{16}$ closed the amplifier $A_t$ is supplied with the input current $(V_{(10)} - V_{(12)}/R_1)$ and adjusts itself so that the current at the point $q$ is zero. The amplifier $A_2$ will also adjust itself so that the current at the point $r$ is zero. This latter adjustment is achieved by regulating the photo sensitive resistor PR so that the amplification in the amplifier $A_t$ becomes $V_{14}/V_{10} - V_{12}$. When the switch $S_{16}$ hereafter is opened the amplification in the amplifier $A_1$ is maintained. When the switch $S_{15}$ is thrown over the voltage different $V_{20} - V_{22}$ is applied to the input of the amplifier $A_1$ whereby the voltage at the point $p$ will be $(V_{20} - V_{22}/V_{10} - V_{12}) . (-V_{14})$ which is the voltage at the point 16 obtained according to the proximity method of FIG. 7. The point $p$ is therefore connected with the point 16a. As it will be understood the circuit of FIG. 17 gives automatically the desired voltage $V_{16a}$. In FIG. 17 the actuation of the switches $S_{15}$ and $S_{16}$ may be controlled from the control network K. In the circuit of FIG. 17 the resistors shown are of substantially equal value in the network C, and $R_{23}$ is substantially equal to $R_{30}$.

As explained hereinbefore the apparatus is also provided with a method selector MS for using the apparatus according to the availability of different data.

In the method as mainly described the data to be read in are two sets of correlated values of pH and $PCO_2$ and in addition thereto pHa and the oxygen saturation.

It is possible, however, to omit one set of the correlated values of pH and $PCO_2$ and instead to read in the hemoglobin value by using the corresponding facility.

Obviously, it is also possible when reading in the hB value to read in $pH_{act}$ with corresponding $PCO_{2act}$, whereby the line first plotted will be the line LA of FIG. 6 and it will then be necessary in order to calculate $BE_{100}$ and BB to replot the line to the line LN.

It will also be possible within the scope of the invention to start with one set of actual $pH_{act}$ and $PCO_{2act}$ values as measured and another set of values as measured and another set of values obtained by processing the blood sample as disclosed in our U.S. Pat. application, Ser. No. 517,370 filed Dec. 29, 1965, which provides a method for treating a biological fluid by means of gas to change the actual $PCO_2$ as measured to a different value whereby at the same time the actual pH is changed so as to provide two correlated pH and $PCO_2$ values.

While in the foregoing no details have been described with respect to the circuits, it is believed that with the principles outlined and the mode of operation described those skilled in the construction of analog computers will be able to design the various integrators, attenuators and other components necessary to perform the functions.

It will be understood that the invention is not limited to the embodiments of the apparatus shown and described and that also other types of division circuits can be used for determining the ratio between the variable voltages and thereby the slope of the line. It will also be understood that the modification according to FIG. 17 or any other modification can be applied to the circuit of FIG. 9 with direct reading in of the hemoglobin value.

While in the foregoing the invention has been described with specific reference to blood samples, it will be understood that the method and apparatus are not limited to use of blood, but that any other biological fluids can be treated according to the method and by means of the apparatus.

We claim:

1. A method for determining at least one unknown data of a biological fluid of which correlated values of data that can be determined vary according to a substantially linear function, comprising the steps of determining a first and a second correlated set of values of said data, producing a first and a second correlated set of voltages corresponding to the two sets of correlated data and being analog therewith, producing a first and a second voltage both of which vary as a function of time and at one moment assume the value of said first set of analog voltages and at another moment assume the value of said second set of analog voltages, producing a third analog voltage which is relevant to the unknown data, comparing said third analog voltage with the first of said varying voltages, and reading out a value or a function of said third varying voltage when said first varying voltage becomes equal with the third analog voltage.

2. A method according to claim 1, in which said third analog varying voltage is a function of one of said first and second varying voltages.

3. A method as claimed in claim 2, in which the initial values of the voltages which vary as a function of time are adjusted in response to a data of the biological fluid which represents a part of the fluid.

4. A method as claimed in claim 2, in which the ratio between said first and second voltages both of which vary as a function of time is regulated in response to differences between each one of said analog voltages and one of said variable voltages at different times.

5. A method as claimed in claim 4, in which the differences at different times between the analog voltages corresponding to the data determined and one of the voltages which vary as a function of time are measured and in which the measurement is repeated a number of times and each measurement is used to reduce the differences by changing the ratio between the variable voltages.

6. A method of determining at least one unknown data of a blood sample comprising the steps of determining correlated values of pH and $PCO_2$, the partial pressure of carbon dioxide of said blood sample, producing two sets of correlated voltages analog with said pH and $PCO_2$ values, producing two voltages which vary as a function of time according to a substantially linear function and at different moments assume the values of said two sets of analog voltages, producing a third variable analog voltage which is a non-linear function of at least one of said time varying voltages and represents a plurality of analog values of the base excess in different blood samples, comparing said third voltage with one of said varying voltages, and maintaining the analog value of the base excess when said time varying voltage becomes equal with said third voltage, and reading out the base excess value.

7. A method as claimed in claim 6, in which one of the sets of correlated pH and $PCO_2$ values is a function of the hemoglobin value of the blood sample.

8. A method as claimed in claim 6, in which the initial values of the voltages which vary as a function of time are a function of hemoglobin values of blood.

9. A method as claimed in claim 8, in which the voltages which vary as a function of time are compared in time sequence with the voltages which are analog with pH and $PCO_2$ and deviations, if any, are used to change the ratio between said variable voltages as well as the initial values thereof.

10. A method as claimed in claim 9, in which the comparison and change of ratio as well as initial values of the variable voltages is repeated until the deviations between the variable voltages and the voltages analog with pH and $PCO_2$ are below predetermined limits.

11. A method as claimed in claim 10, in which the comparisons and changes are repeated a further plurality of times after the deviations have been found to be below the predetermined limits.

12. A method as claimed in claim 6, in which the actual value of pH of the blood sample is measured and a corresponding analog voltage is produced and the variable voltages are adjusted to correspond to a value of $PCO_2$ which enables the analog value of the actual $PCO_2$ to be determined.

13. In an apparatus for determining at least one unknown data of a biological fluid of which correlated values of data which can be determined vary according to a substantially linear function, comprising in combination means for producing a first and a second correlated set of voltages corresponding to two sets of correlated data and being analog therewith, means for producing a first and a second voltage both of which vary as a function of time and at one moment assume the value of said first set of analog voltages and at another moment assume the value of said second set of analog voltages, means for producing a third varying analog voltage which is relevant to the unknown data, means for comparing said third analog voltage with the first of said varying voltages, and means for reading out a value or a function of said third analog voltage when said first varying voltage becomes equal with said third analog voltage.

14. Apparatus as claimed in claim 13, further comprising means for adjusting the initial values as well as the ratio between the voltages which vary as a function of time.

15. Apparatus as claimed in claim 13, further comprising means for comparing in time sequence the voltages which vary as a function of time with the analog voltages and means for adjusting the initial values of as well as the ratio between the variable voltages in response to the comparison.

16. Apparatus as claimed in claim 13, wherein said first and second varying voltage producing means comprises a voltage source, a pair of integrators in operative connection with the voltage source and responsive to said correlated voltage set generating means, two outputs from said pair of integrators, a function generator operable to produce said third voltage connected to one of said two outputs, an output of the function generator, a limit sensor connected with the output of said function generator and the other output from said pair of integrators and wherein said reading out means includes means for maintaining a value of said third voltage or a function thereof when it becomes equal to said second output voltage.

17. In an analog computing apparatus for determining at least one unknown data of biological fluid of which correlated values of data that can be determined vary according to a substantially linear function and of which a first and a second set of correlated values are determined, comprising in combination:

first means for reading in a first and a second set of correlated voltages being analog with two sets of correlated data each representing abscissa and ordinate respectively of each of two spaced points in a hypothetical coordinate system, second means for producing two voltages which vary as a function of time and in sequence assume the values of said first set of read-in voltages and the values of said second set of read-in voltages symbolizing a substantially straight line through said two points of the hypothetical coordinate system, third means for producing at least a third analog voltage relevant to the unknown data, fourth means for comparing said third analog voltage with one of said variable voltages corresponding to finding the point of intersection between said substantially straight line in the hypothetical coordinate system and a curve therein corresponding to said third voltage and fifth means for reading out a value of at least one of said variable voltages or a function thereof when the value of the first variable voltage is equal with said third voltage.

18. Apparatus as claimed in claim 17, further comprising sixth means for comparing in time sequence the voltages which vary as a function of time with the analog voltages and means for adjusting the initial values of as well as the ratio between the variable voltages in response to the comparison.

19. Apparatus as claimed in claim 17, wherein said second means comprises a voltage source, a pair of integrators in operative connection with the voltage source and responsive to said first means, two outputs from said pair of integrators, a function generator operable to produce said third voltage connected to one of said two outputs, an output of the function generator, a limit sensor connected with the output of said function generator and the other output from said pair of integrators and wherein said fifth means includes means for maintaining a value of said third voltage or a function thereof when it becomes equal with said second output voltage.

20. In analog computing apparatus for determining at least one unknown data of a blood sample of which correlated values of pH and $PCO_2$, the partial pressure of carbon dioxide, are determined, comprising in combination:

means for reading in a first and a second set of correlated voltages being analog with two sets of correlated values of pH and $PCO_2$ each representing the abscissa and ordinate respectively of each of two spaced points in a hypothetical coordinate system, means for producing two voltages which vary as a function of time and in sequence assume the values of said first set of analog voltages and the values of said second set of analog voltages symbolizing a substantially straight line through said two points of the hypothetical coordinate system, means for producing at least a third analog voltage which varies as a function of time and represents the base excess of blood, means for comparing said third voltage with the first of said variable voltages corresponding to finding the point of intersection between said substantially straight line in the hypothetical coordinate system and a curve therein, which represents the base excess, and means for reading out the value of the base excess when the value of the first variable voltage is equal with said third voltage which represents the base excess.

21. Apparatus as claimed in claim 20, further comprising means for reading in actual pH and reading out actual $PCO_2$.

22. Apparatus as claimed in claim 20, further comprising means for adjusting the initial values of the variable voltages to assume values corresponding to the analog value of the contents of hemoglobin in the blood sample.

23. Apparatus as claimed in claim 22, further comprising means for reading out the analog value of the hemoglobin.

24. Apparatus as claimed in claim 20, further comprising means for reading in the analog value of the hemoglobin.

25. Apparatus as claimed in claim 20, further comprising means for changing the ratio between the two voltages which vary as a function of time in response to the actual oxygen saturation of the blood sample.

26. In an analog computing apparatus for determining at least one unknown data of a blood sample of which a first and a second set of correlated values of pH and $PCO_2$, the partial pressure of carbon dioxide, are determined comprising in combination:

first means for reading in a first and a second set of correlated analog voltages corresponding to said two sets of correlated values each representing abscissa and ordinate respectively of each of two spaced points in a hypothetical coordinate system, second means for producing two voltages which vary as a function of time and in sequence assume the values of said first set of read-in voltages and the values of said second set of read-in voltages symbolizing a substantially straight line through said two points of the hypothetical coordinate system, third means for producing a non-linear function of at least one of said variable voltages symbolizing the base excess curve of a Siggaard Andersen nomogram, fourth means for comparing the first of said variable voltages with said non-linear function corresponding to finding the point of intersection between said substantially straight line and said base excess curve in the hypothetical coordinate system, and an analog memory for maintaining the value of said non-linear function or a function thereof when the first one of said variable voltages is equal with said non-linear function voltage.

27. Apparatus as claimed in claim 26, further comprising an additional analog memory and an interconnected calculation network for calculating and maintaining the analog values of data representative of the said straight line in the hypothetical coordinate system.

28. Apparatus as claimed in claim 27, wherein said network comprises a network for calculating actual base excess $BE_{act}$ by means of the formula $BE_{act} = BE_{100} + K' \cdot Hb \, (100 - SO_2/100)$ where $BE_{100}$ is the base excess for 100 percent saturation of the blood with $O_2$, Hb is hemoglobin in grams per 100 mls. and $SO_2$ is the actual oxygen saturation of the blood sample and $K'$ is a constant.

29. Apparatus as claimed in claim 27, wherein said network comprises a network for calculating the actual bicarbonate ABC by means of the formula $\log ABC = pH_a - K + \log(\alpha \cdot PCO_{2a})$ where $\alpha$ is the solubility coefficient of carbon dioxide in blood plasma and $K$ is a constant, whereas $pH_a$ is the actual pH value of the blood sample and $PCO_{2a}$ is the actual value of $PCO_2$ in the blood sample.

30. Apparatus as claimed in claim 27, wherein said network comprises a network for calculating the buffer base by means of the formula $BB = BE_{100} + K_3 + K_4 \cdot Hb$ where $BE_{100}$ is the base excess for 100 percent saturation of the blood with oxygen, Hb is hemoglobin in grams per 100 ml. and $K_3$ and $K_4$ are constants.

31. Apparatus as claimed in claim 27, said network comprising means for calculating the actual base excess $BE_{act}$ by means of the formula $BE_{act} = BE_{100} + K' \cdot Hb \cdot (100 - SO_2/100)$ where $BE_{100}$ is the base excess for 100 percent saturation of the blood with oxygen, Hb is hemoglobin in grams per 100 ml, $SO_2$ is the actual oxygen saturation of the blood sample and $K'$ is a constant and means for changing said substantially straight line such that this line will correspond to the actual base excess value.

32. Apparatus as claimed in claim 27, wherein said network comprises further comprising means for calculating the base excess of fully oxygenated blood, $BE_{100}$ by means of the formula $BE_{100} = BE_{act} - K' \cdot Hb \cdot (100 - SO_2/100)$ where $BE_{act}$ is the actual base excess, Hb is hemoglobin in grams per 100 ml., $SO_2$ is the actual oxygen saturation of the blood sample and $K'$ is a constant and means for changing said substantially straight line such that this line will correspond to the base excess value of fully oxygenated blood.

33. Apparatus as claimed in claim 26, further comprising means coupled to said second means for changing the ratio $\Delta L$ between the voltages which vary as a function of time by means of the formula $\Delta L = (K_1/K_2 - BE_{100}) \cdot (100 - SO_2) \cdot F(Hb)$ in which $F(Hb)$ is a function of the hemoglobin content of the blood sample, $BE_{100}$ is the base excess for 100 percent saturation of the blood with oxygen, $SO_2$ is the actual oxygen saturation of the blood and $K_1$ and $K_2$ are constants.

* * * * *